United States Patent
Jian et al.

(10) Patent No.: US 11,048,132 B2
(45) Date of Patent: Jun. 29, 2021

(54) DISPLAY PANEL AND DISPLAY APPARATUS

(71) Applicant: Shanghai AVIC OPTO Electronics Co., Ltd., Shanghai (CN)

(72) Inventors: Shoufu Jian, Shanghai (CN); Feng Qin, Shanghai (CN); Dandan Qin, Shanghai (CN); Benshun Zhong, Wuhan (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/942,786

(22) Filed: Jul. 30, 2020

(65) Prior Publication Data

US 2020/0355972 A1    Nov. 12, 2020

(30) Foreign Application Priority Data

Nov. 6, 2019   (CN) .......................... 201911077559.3
May 27, 2020   (CN) .......................... 202010463366.8

(51) Int. Cl.
*G02F 1/1362*   (2006.01)
*G02F 1/1345*   (2006.01)
*G02F 1/1368*   (2006.01)

(52) U.S. Cl.
CPC ...... *G02F 1/136286* (2013.01); *G02F 1/1345* (2013.01); *G02F 1/1368* (2013.01); *G02F 1/13452* (2013.01); *G02F 1/13454* (2013.01); *G02F 1/13458* (2013.01)

(58) Field of Classification Search
CPC .............. G02F 1/1345; G02F 1/13452; G02F 1/13454; G02F 1/13456; G02F 1/13458; G02F 1/136286
See application file for complete search history.

(56) References Cited

U.S. PATENT DOCUMENTS

2006/0238450 A1* 10/2006 Onodera ............... G02F 1/1309
                                                             345/60

FOREIGN PATENT DOCUMENTS

KR        20080049912 A   *  6/2008

* cited by examiner

*Primary Examiner* — Jessica M Merlin
(74) *Attorney, Agent, or Firm* — Kilpatrick Townsend & Stockton, LLP

(57) ABSTRACT

Provided are a display panel and a display apparatus. The display panel has a bonding region where a chip is bonded, and a fan-out region where fan-out leads is arranged. Bonding pads in the bonding region include a first pad array and a second pad array, the first pad array being at a side of the second pad array close to the display region. The first pad array includes first pads arranged in at least two rows. The first pad array includes at least one inclined section including at least three first pads that are arranged sequentially and obliquely away from the display region. Such an arrangement allows at least a portion of the fan-out leads to be displaced into the bonding region, to increase the area for arranging the fan-out leads. Therefore, the lower border of the display panel is narrowed.

23 Claims, 19 Drawing Sheets

DISPLAY PANEL AND DISPLAY APPARATUS

CROSS-REFERENCE TO RELATED APPLICATIONS

The present application claims priority to Chinese Patent Application No. CN201911077559.3, filed on Nov. 6, 2019 and Chinese Patent Application No. CN202010463366.8, filed on May 27, 2020, the contents of which are incorporated herein by reference in their entireties.

FIELD

The present disclosure relates to the field of display technologies, and particularly, to a display panel and a display apparatus.

BACKGROUND

With the continuous development of the display market, consumers have higher and higher requirements on visual effects of display screens, including a diversified appearance of display screens and a higher screen-to-body ratio. Thus, a full-screen technology has emerged, which tends to peruse a screen-to-body ratio greater than or equal to 90% by designing an ultra-narrow border or even no border, to allow a display region to be maximized and achieve a more stunning visual effect without changing the total body area.

The chip on glass (COG) is the most frequently used technology in the current display devices. However, bonding the integrated circuit (IC) directly on the display panel glass occupies the non-display region of the screen of the display panel, which is disadvantageous to the narrow-border and full-screen design of the display panel.

SUMMARY

In view of the above, the present disclosure provides a display panel and a display apparatus, to optimize the layout of structures in the display panel without deteriorating the performances of the driving chip, facilitating narrowing of the boarder of the display panel for image display.

An embodiment present disclosure provides a display panel having a display region and a non-display region surrounding the display region. The non-display region includes a bonding region and a fan-out region. The display panel includes: a plurality of signal lines extending along a first direction and arranged along a second direction in the display region, the first direction intersecting with the second direction; a driving chip bonded in the bonding region; a plurality of bonding pads provided in the bonding region; and a plurality of fan-out leads provided in the fan-out region. The plurality of bonding pads includes a first pad array and a second pad array, the first pad array being located at a side of the second pad array close to the display region. The first pad array includes a plurality of first pads arranged in at least two rows, and the plurality of signal lines is electrically connected to the plurality of first pads via the plurality of fan-out leads. The second pad array include a plurality of second pads arranged in at least one row, and the plurality of second pads is electrically connected to corresponding signal pins on a flexible circuit board. The first pad array includes a first pad group, first pads in a same row in the first pad group includes at least one inclined section each composed of at least three first pads that are sequentially arranged, and in one of the at least one inclined section, an included angle between the second direction and a connection line connecting a vertex of a first one of the at least three first pads with a vertex of a last one of the at least three first pads is defined as an inclination angle of the one inclined section, and the inclination angle is an acute angle $\theta 1$.

Based on the same concept, an embodiment of the present disclosure further provides a display apparatus including the above display panel.

BRIEF DESCRIPTION OF DRAWINGS

The drawings described herein are for the purpose of explaining the present disclosure and constitute a part of the present disclosure. The embodiments and descriptions thereof are intended to illustrate the present disclosure, rather than limiting the present disclosure.

DESCRIPTION OF EMBODIMENTS

The embodiments of the present disclosure will be clearly described in details below with reference to the drawings of the embodiments of the present disclosure. The described embodiments are a part of the embodiments of the present disclosure, rather than all the embodiments. Based on the embodiments of the present disclosure.

It should be noted that the embodiments in the present disclosure and the features in the embodiments can be combined with each other if there is no conflict. The present disclosure will be described in details below with reference to the drawings and in conjunction with the embodiments.

Figure 1:
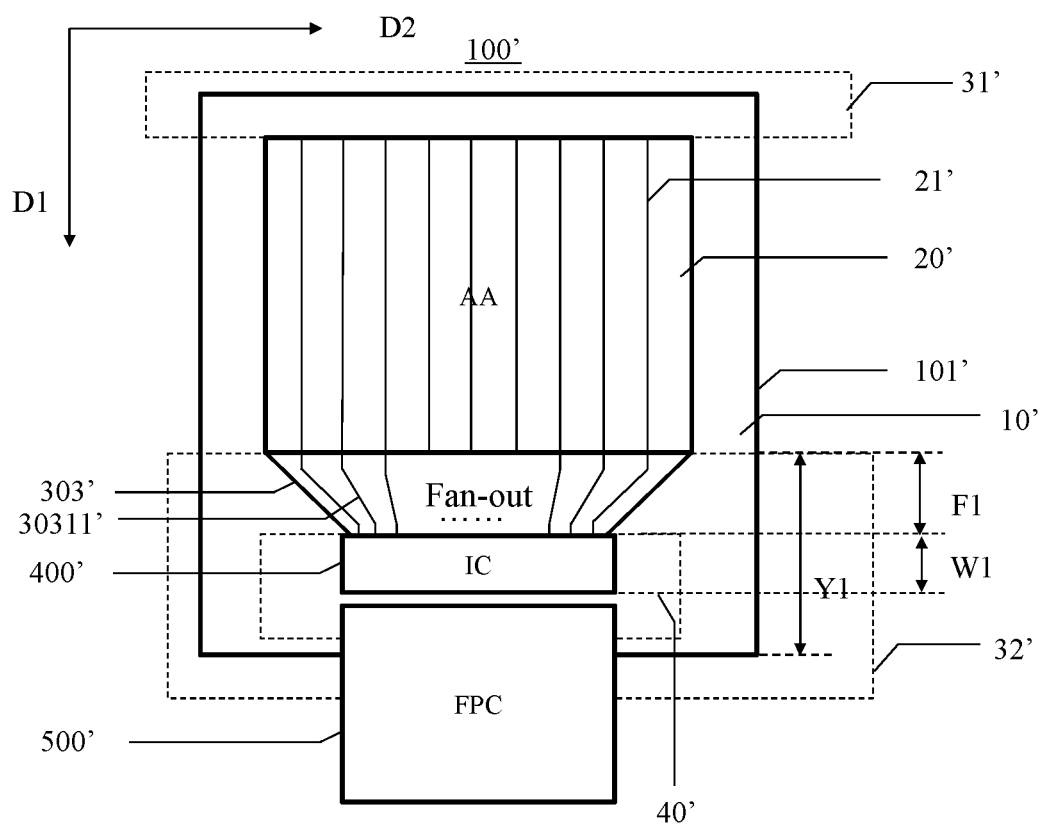
FIG. 1 is a schematic plan view of a display panel provided by the related art.
Figure 2:
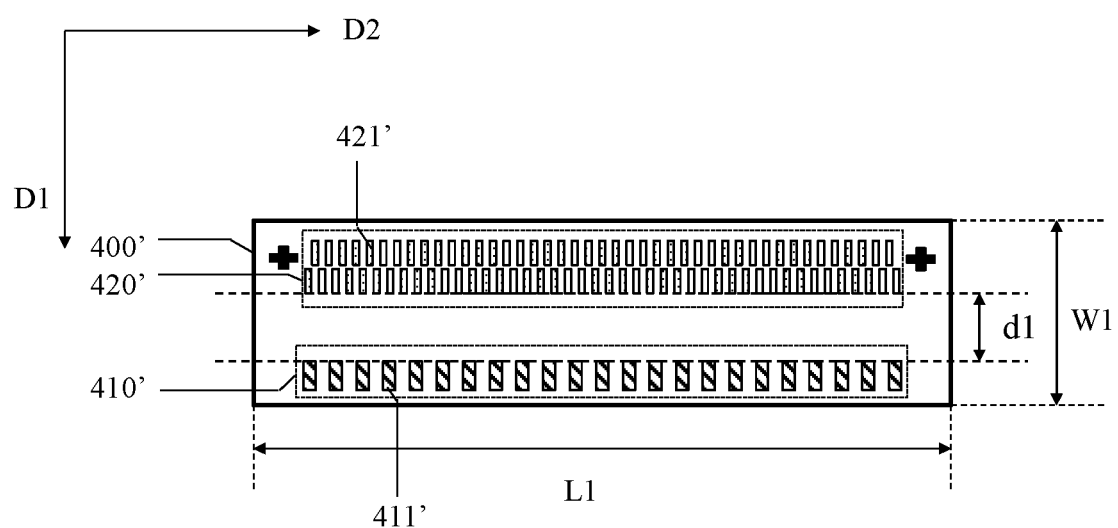
FIG. 2 is a schematic plan view of a driving chip in a display panel provided by the related art.

FIG. 1 is a schematic plan view of a display panel provided by the related art, and FIG. 2 is a schematic plan view of a driving chip in a display panel provided by the related art.

As shown in FIGS. 1-2, the display panel 100' in the related art includes a substrate 101', a driving chip 400', and a flexible circuit board 500'. The substrate 101' has a display region 20' (also referred to as an area AA) and a non-display region 10' surrounding the display region 20'. In the display region 20', signal lines 21' extending along a first direction and arranged along a second direction is provided. In some embodiments, the signal lines 21' may include one or both of a data line and a touch signal line. Along the first direction, the non-display region 10' includes an upper border area 31' and a lower border area 32'. In the present embodiment of the present disclosure, the upper border area 31', the display region 20', and the lower border area 32' are sequentially arranged along the first direction. The lower border area 30' includes a fan-out region 303' and a bonding region 40', and a driving chip 400' is bonded to on the substrate 101' in the bonding region 40' in the form of chip on glass (COG). In an embodiment, the substrate 101' may be a glass substrate, a plastic substrate, or a substrate made of any other thin film material that can be used as a supporting base. In the drawings, the first direction is the direction indicated by D1, the second direction is the direction indicated by D2, and the first direction is perpendicular to the second direction.

Further referring to FIGS. 1-2, in a direction perpendicular to a plane of the substrate 101', the driving chip 400' has a rectangular shape when observed from top, a length of the driving chip 400' is L1, and a width of the driving chip 400' is W1. Arrays of terminals used for connecting external devices are formed respectively near a first edge and a second edge of the rectangular shape that are parallel to each other. For example, the terminal arrays include an input terminal array 410' and an output terminal array 420' that are arranged in parallel. The input terminal array 410' includes a plurality of input terminals 411', and the plurality of input terminals 411' is arranged side by side along an extending direction of a long side of the driving chip 400'. The output terminal array 420' includes a plurality of output terminals 421', and the plurality of output terminals 421' is arranged side by side along an extending direction of another long side of the driving chip 400'. A plurality of signal lines 21' located in the display region 20' of the display panel 100' is electrically connected to the plurality of output terminals 421' of the output terminal array 420' on the driving chip 400' in one-to-one correspondence via fan-out leads 30311' in the fan-out region 303'. Since a width of an area where all the signal lines 21' occupy is greater than the length L1 of the driving chip 400', and all the fan-out leads 30311' used for connection are electrically insulated from each other (i.e., all the fan-out leads are spaced apart from each other), it is necessary to bend the fan-out leads 30311' with respect to the signal lines 21', i.e., the fan-out leads are bent with respect to the signal lines 21', in order to electrically connect the signal line 21' with the corresponding signal terminals of the driving chip 400'. As a large number of signal lines 21' is provided, the number of the fan-out leads 30311' is also large. Generally, due to the relatively small length L1 of the driving chip 400', it is only possible to electrically insulate all the fan-out leads 30311' from one another by prolonging a length of the fan-out leads 30311'. Therefore, an area occupied by the fan-out region 303' has a relatively great height F1. Further, since the fan-out region 303' is located in the non-display region of the display panel, then the non-display region has a relatively great height Y1, i.e., the display panel and the display apparatus including the display panel have borders of a relatively great size.

The current lower border has a size Y1 greater than a sum of the height F1 of the fan-out region 303' in the first direction, the width W1 of the driving chip 400', and a height of the bonding region of the flexible circuit board 500' in the first direction. Narrowing of the boarder of the display panel 100' is to shorten a short side of the bonding region 40' of the driving chip 4 connected to the display region 20' of the display panel 100'. In order to achieve the narrowing of the boarder, the size of the driving chip 400' may be reduced by reducing a layout area through refinement of process flow and reduction of functions, etc. However, the cost will increase with the refinement of the process flow, and the requirements for high function or high performance will also become higher. In this regard, it is impossible to obtain a narrower boarder simply by reducing the size of the short side of the driving chip 400'. In addition, the height F1 of the fan-out region 303' in the first direction can be hardly compressed due to the limitation of the large number of signal lines.

Embodiments of the present disclosure are configured to optimize the layout of structures in the display panel without sacrificing the performance of the driving chip, and to facilitate the narrowing the border of the display panel used for image display.

In order to solve the above problems, embodiments of the present disclosure provide a display panel and a display apparatus.

Figure 3:
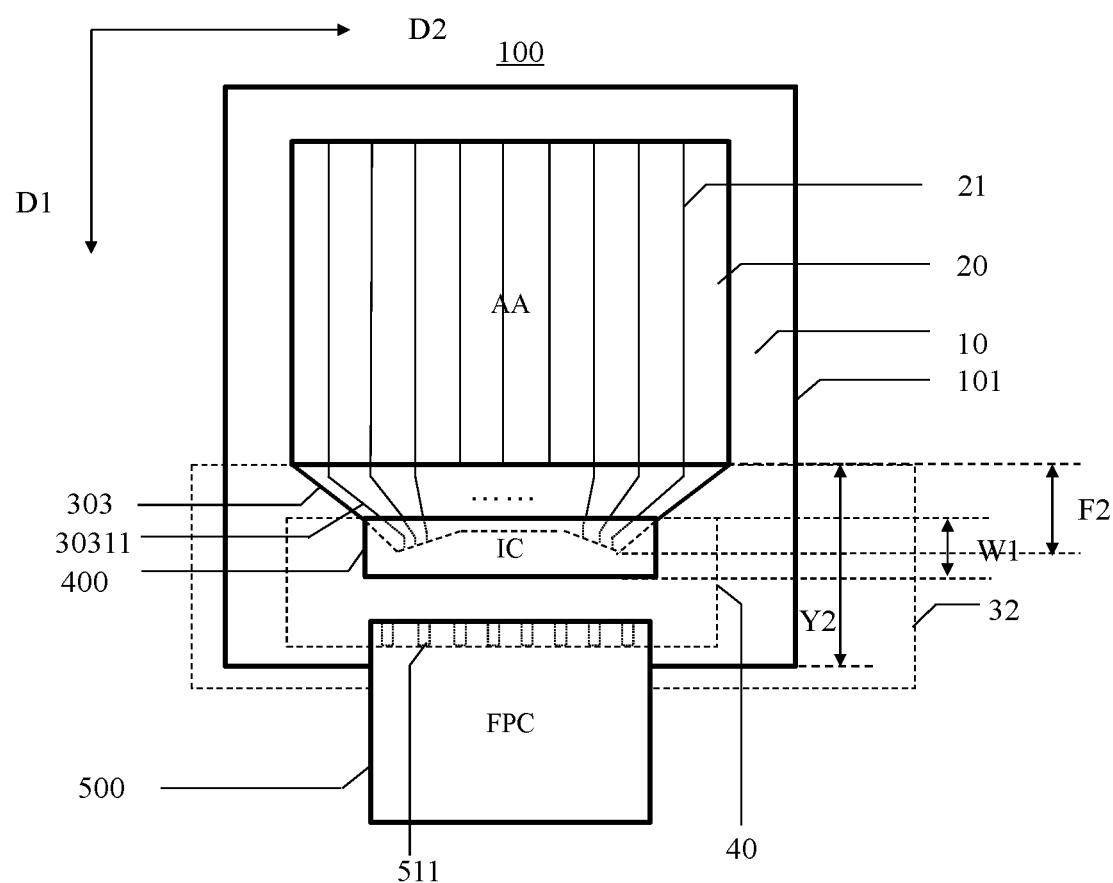
FIG. 3 is a schematic plan view of a display panel according to an embodiment of the present disclosure.
Figure 4:
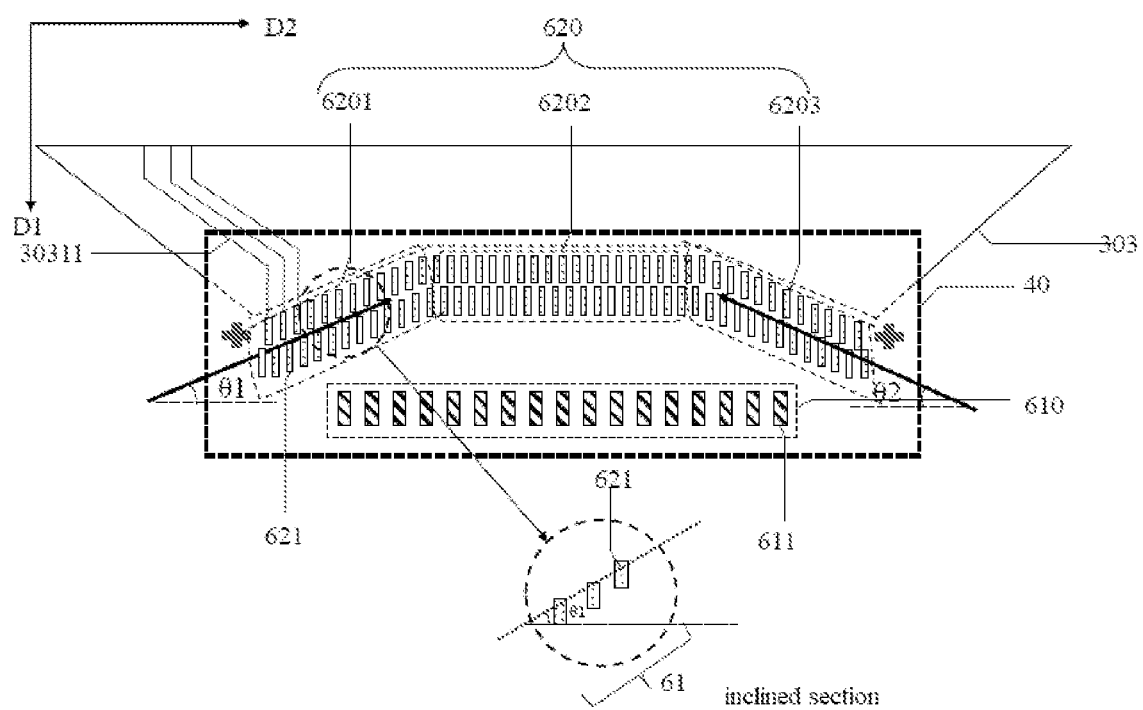
FIG. 4 is a schematic plan view illustrating an arrangement of bonding pads in a bonding region where a driving chip is to be bonded and a fan-out region of a display panel according to an embodiment of the present disclosure.

FIG. 3 is a schematic plan view of a display panel according to an embodiment of the present disclosure, and FIG. 4 is a schematic plan view illustrating an arrangement of bonding pads in a bonding region where a driving chip is to be bonded and a fan-out region of a display panel according to an embodiment of the present disclosure.

As shown in FIG. 3 and FIG. 4, the display panel 100 according to the present embodiment of the present disclosure has a display region 20 and a non-display region 10 surrounding the display region 20. A plurality of signal lines 21 extending along a first direction and arranged along a second direction is provided in the display region 20. In some embodiments, the signal lines 21 may include one or both of a data line and a touch signal line. The non-display region 10 includes a bonding region 40 and a fan-out region 303. A driving chip 400 is bonded in the bonding region 40, a plurality of bonding pads 611, 621 is provided in the bonding region 40, and a plurality of fan-out leads 30311 is provided in the fan-out region 303. The plurality of bonding pads 611, 621 includes a first pad array 620 and a second pad array 610. The first pad array 620 is located at a side of the second pad array 610 close to the display region 20. The first pad array 620 includes a plurality of first pads 621. The plurality of first pads 621 is arranged in at least two rows, and adjacent two rows of first pads 621 are arranged in a staggered manner. Each signal line 21 located in the display region 20 is electrically connected to one of the first pads 621 via one corresponding fan-out lead 30311. The second pad array 610 includes a plurality of second pads 611. The plurality of second pads 611 is arranged in at least one row, and adjacent two rows of first pads 621 are arranged in a staggered manner. The plurality of second pads 611 is electrically connected to corresponding signal pins 511 of the flexible circuit board 500, to provide input signals to the display panel. The above first pad array 620 includes a first pad group 6201. In the first pad group 6201, the same row of first pads 621 include at least one inclined section 61 each composed of at least three first pads 621 that are sequentially arranged. In a same inclined section 61, an included angle between the second direction and a connection line connecting a vertex of a first one of the at least three first pads 621 with a vertex of a last one of the at least three first pads 621 is defined as an inclination angle of this inclined section 61, and the inclination angle is θ1. That is, among the first pads 621 in the first pad array 620, multiple first pads 621 are arranged in an inclined sequence with an end inclined away from the display region 20.

It should be noted that, in one inclined section 61, the connection line connecting the vertexes of the first pad 621 is always connecting left vertexes or right vertexes of the same ends of the first pads 621, without crossing selections of the ends or the left and right vertexes. In addition, in the embodiment of the present disclosure, the inclined section 61 is composed of at least three first pads 62 that are sequentially arranged. In the same inclined section 61, the included angle between the second direction and the connection line connecting the vertex of the first one of the at least three first pads 621 to the vertex of the last one of the at least three first pads 621 is defined as the inclination angle θ1 of this inclined section 61. It should be interpreted as below: the at least three sequentially-arranged first pads 621 may be arranged in a step-like pattern, as long as the at least three sequentially-arranged first pads 621 are arranged towards one direction in a step-like pattern, without requiring that the connection lines of the right vertexes of the at least three sequentially-arranged first pads 621 is completely in one straight line.

Since the first pad array 620 includes at least one inclined section 61 and the inclined section 61 includes at least three sequentially-arranged first pads 621 that are arranged in a sequence with an end inclined away from the display region 20, such an arrangement increases an area for arranging the fan-out leads by moving a portion of the fan-out leads to the bonding region. In this way, in the first direction, the fan-out region 303 overlaps the bonding region 40 of the driving chip, which reduces the total height of the fan-out region 303 and the driving chip 400 in the first direction and narrows the lower border of the display panel 100, achieving a higher screen-to-body ratio.

Figure 5:
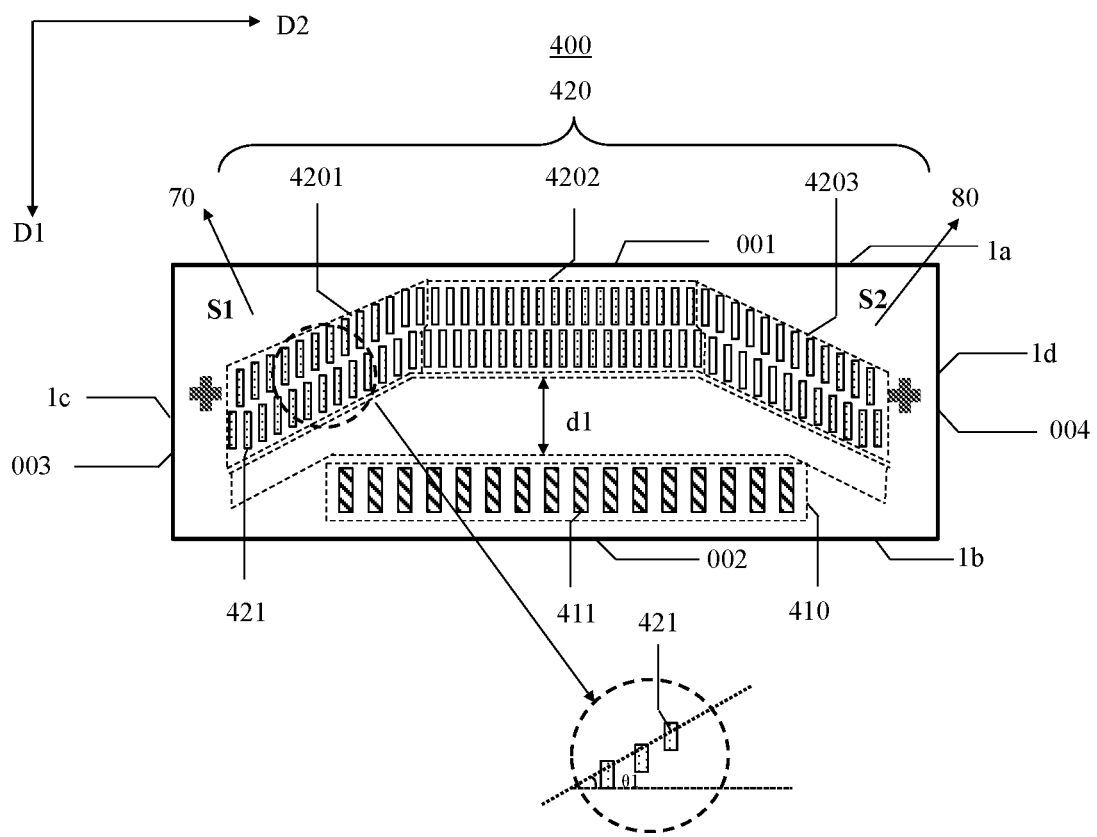
FIG. 5 is a schematic plan view of a driving chip in a display panel according to an embodiment of the present disclosure.

FIG. 5 is a schematic plan view of a driving chip in a display panel according to an embodiment of the present disclosure.

As shown in FIG. 5, the driving chip 400 configured to drive the display panel 100 includes two opposite long sides 001, 002 and two opposite short sides 003, 004. A first terminal array 420 is provided near a first edge 1a of one of the long sides of the driving chip 400, and the first terminal array 420 includes a plurality of first terminals 421 arranged in at least two rows. A second terminal array 410 is provided near a second edge 1b of the other one of the long sides of the driving chip 400, and the second terminal array 410 includes a plurality of second terminals 411 arranged in at least one row. The driving chip 400 is mounted in the bonding region 40 of the display panel 100, for example, the driving chip 400 is bonded in the bonding region 40 via an anisotropic conductive film (ACF). The plurality of first terminals 421 on the driving chip 400 is bonded and electrically connected to the plurality of first pads 621 on the display panel 100 in one-to-one correspondence. The plurality of second terminals 411 on the driving chip 400 is bonded and electrically connected to the plurality of second pads 611 on the display panel 100 in one-to-one correspondence.

In an embodiment, the first terminal 421 and the second terminal 411 are both in a strip shape, and long sides of the strip shape of each first terminal 421 are parallel to the short side edges 1c, 1d of the driving chip 400, and long sides of the strip shape of each second terminal 411 are parallel to the short side edges 1c, 1d of the driving chip 400. That is, the lengths of all the first terminals 421 extend in the same direction, and the lengths of all the second terminals 411 extend in the same direction. In an embodiment, each first terminal 421 and each second terminal 411 have the same shape and size.

Regarding the design of the terminals of the driving chip 400 mounted on the display panel 100, the second terminals 411 on the driving chip 400 are configured to provide input signals such as power signals, amorphous silicon gate (ASG) driving signals, boost signals, display communication interface signals, touch communication interface signals, etc., the first terminals 421 of the driving chip 400 are configured to provide output signals. The first terminals 421 that are correspondingly connected to the fan-out leads 30311 are required to apply corresponding data signals to the signal lines 21 located in the display region 20 one by one. The data signals include, for example, data signals for driving display and/or touch signals, etc. Therefore, the number of the first terminals 421 is significantly greater than the number of the second terminals 411. Accordingly, on the display panel 100, the number of the first pads 621 is significantly greater than the number of the second pads 611. In an embodiment, the plurality of first terminals 421 are arranged in at least two rows, and adjacent two rows of first terminals 421 are arranged in a staggered manner. Due to the limited size of the driving chip 400, in a case that the increased first terminals 421 cannot be arranged in one row on an output signal side, the setting of multiple rows of first terminals 421 arranged in a staggered manner is beneficial to a wiring connection design of the fan-out leads 30311. Such a staggered arrangement can also avoid crossing or signal interference between adjacent fan-out leads 30311. Similarly, the plurality of second terminals 411 can also be arranged in multiple rows in a staggered manner.

Figure 6:
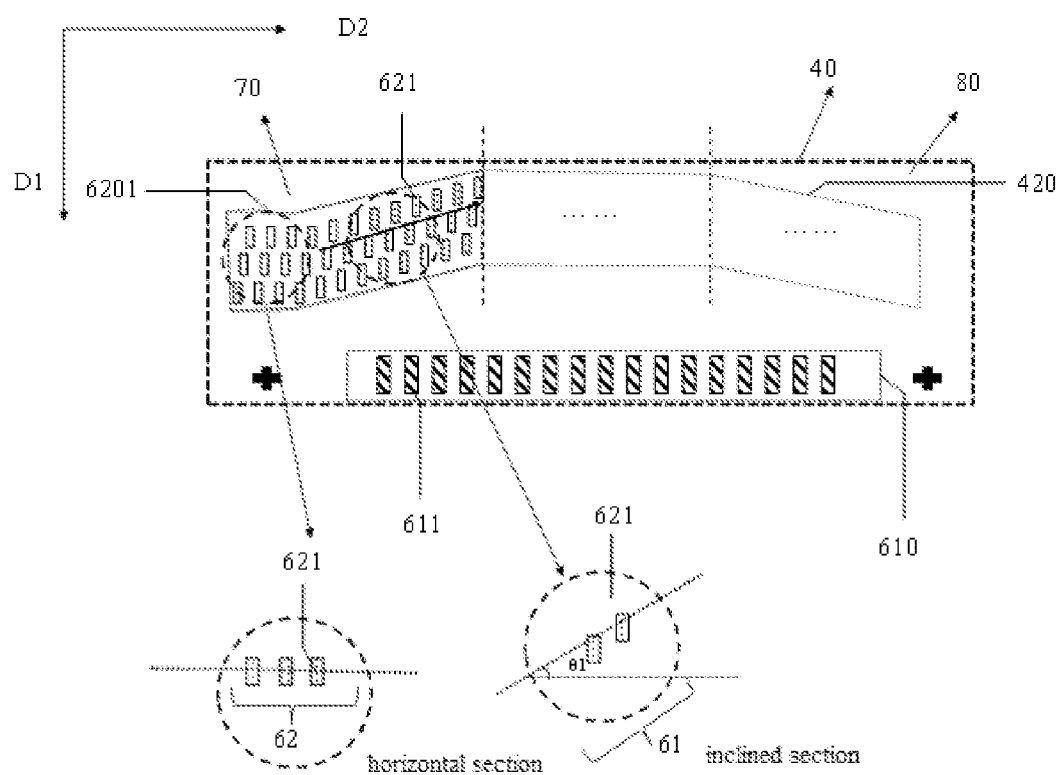
FIG. 6 is a schematic plan view illustrating an arrangement of bonding pads in a bonding region where a driving chip is to be bonded of a display panel according to another embodiment of the present disclosure.

FIG. 6 is a schematic plan view illustrating an arrangement of bonding pads in a bonding region where a driving chip is to be bonded of a display panel according to another embodiment of the present disclosure.

As shown in FIG. 6, the first pad group 6201 in the first pad array 620 includes at least one inclined section 61 and at least one horizontal section 62. The vertexes or center points of the first pads 621 in the horizontal section 62 are connected by a connection line parallel to the second direction.

Figure 7:
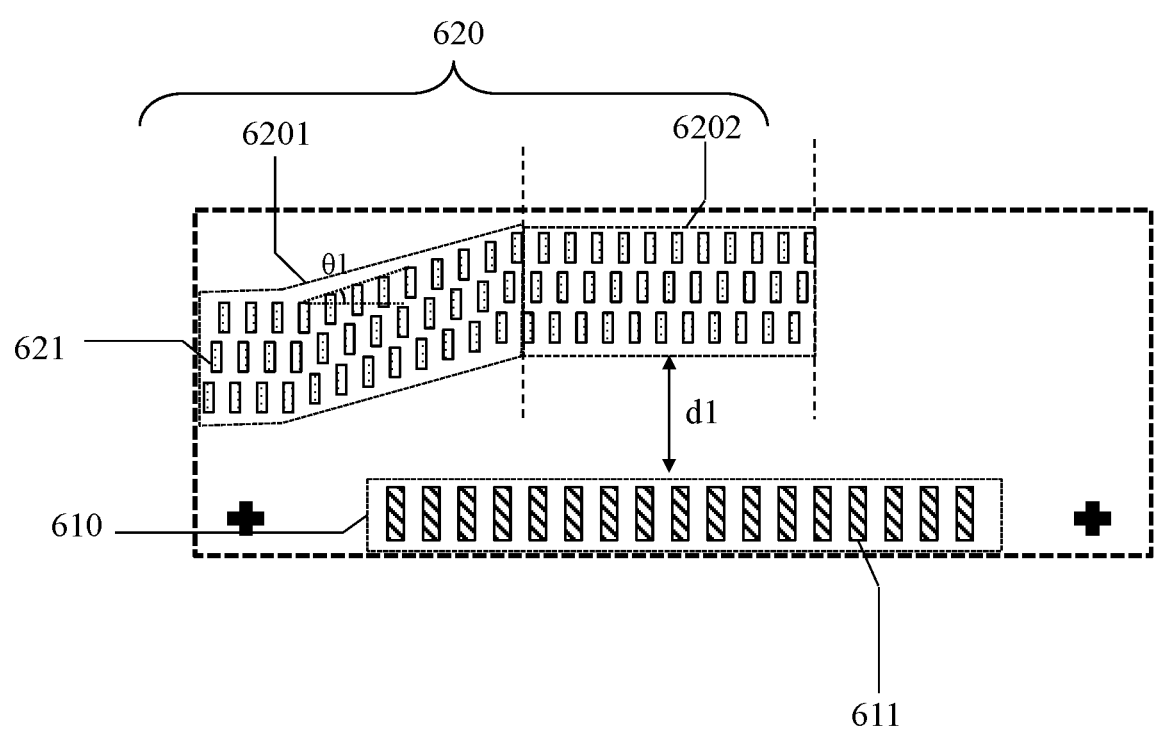
FIG. 7 is a schematic plan view illustrating an arrangement of bonding pads in a bonding region where a driving chip is to be bonded of a display panel according to yet another embodiment of the present disclosure.

FIG. 7 is a schematic plan view illustrating an arrangement of bonding pads in a bonding region where a driving chip is to be bonded of a display panel according to yet another embodiment of the present disclosure.

As shown in 7, the first pad array 620 further includes a second pad group 6202. Along the second direction, the second pad group 6202 is located at a side of the first pad group 6201; and the second pad group 6202 and the second pad array 610 are arranged opposite to each other along the first direction. In an embodiment, a connection line of the vertexes or center points of the first pads 621 in the second pad group 6202 is a straight line parallel to the second direction. In the first direction, a vertical distance d1 between the second pad array and the second pad group is greater than or equal to 100 μm. When the driving chip 400 is mounted on the display panel, i.e., the first terminal array 420 and the second terminal array 410 are still disposed at two sides of the driving chip 400 along an extension direction of the short side of the driving chip 400, so that a bonding pressure on the two sides of the driving chip 400 is balanced, and a reliability and a qualification rate of the bonding are enhanced, compared with a manner that the first pad array 620 and the second pad array 610 are directly pulled closer to each other.

Figure 8:
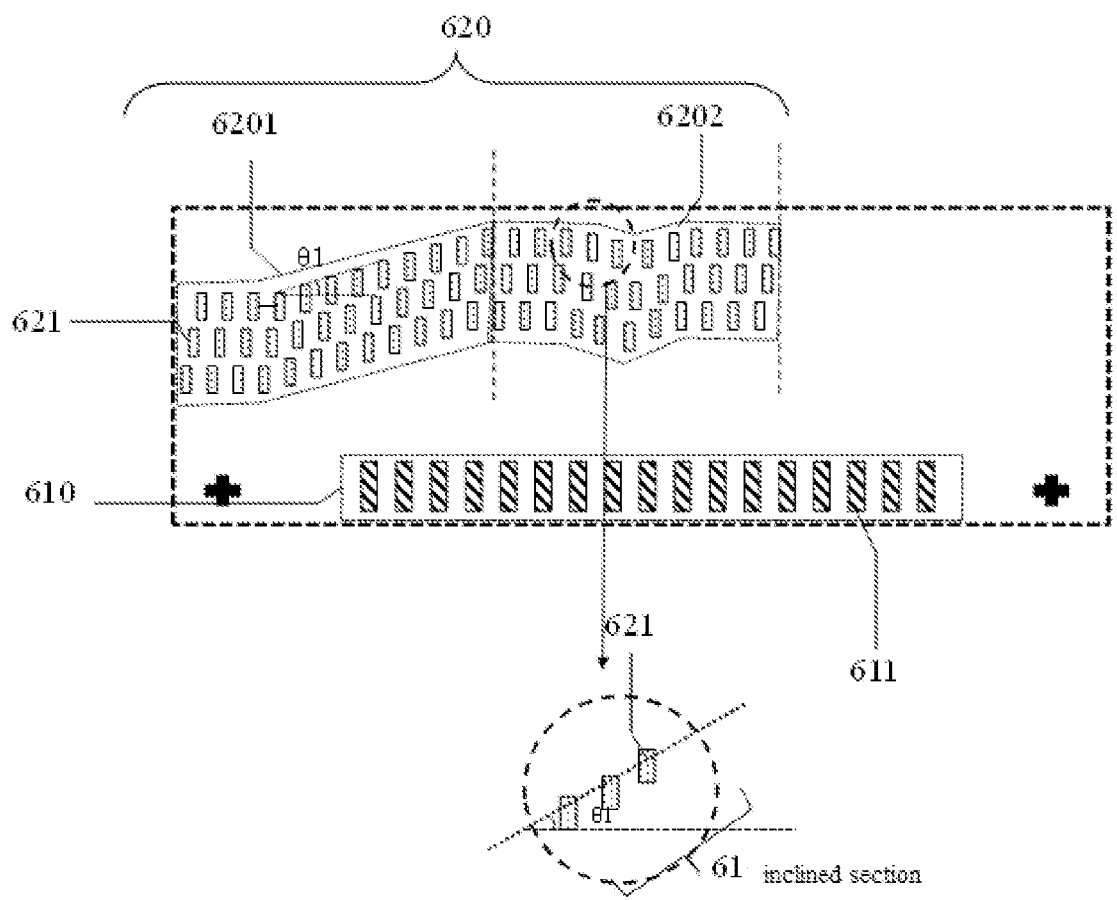
FIG. 8 is a schematic plan view illustrating an arrangement of bonding pads in a bonding region where a driving chip is to be bonded of a display panel according to yet another embodiment of the present disclosure.

FIG. 8 is a schematic plan view illustrating an arrangement of bonding pads in a bonding region where a driving chip is to be bonded of a display panel according to yet another embodiment of the present disclosure.

As shown in FIG. 8, in this embodiment, the second pad group 6202 may also have at least one inclined section 61 as the first pad group 6201, or the arrangement of the first pads 421 in the second pad group 6202 may be in a V shape, a wavy shape, or an arc shape, which is not limited herein.

In an embodiment, the first pad group 6201, as a whole, is displaced away from the display region 20 with respect to the second pad group 6202.

Figure 9:
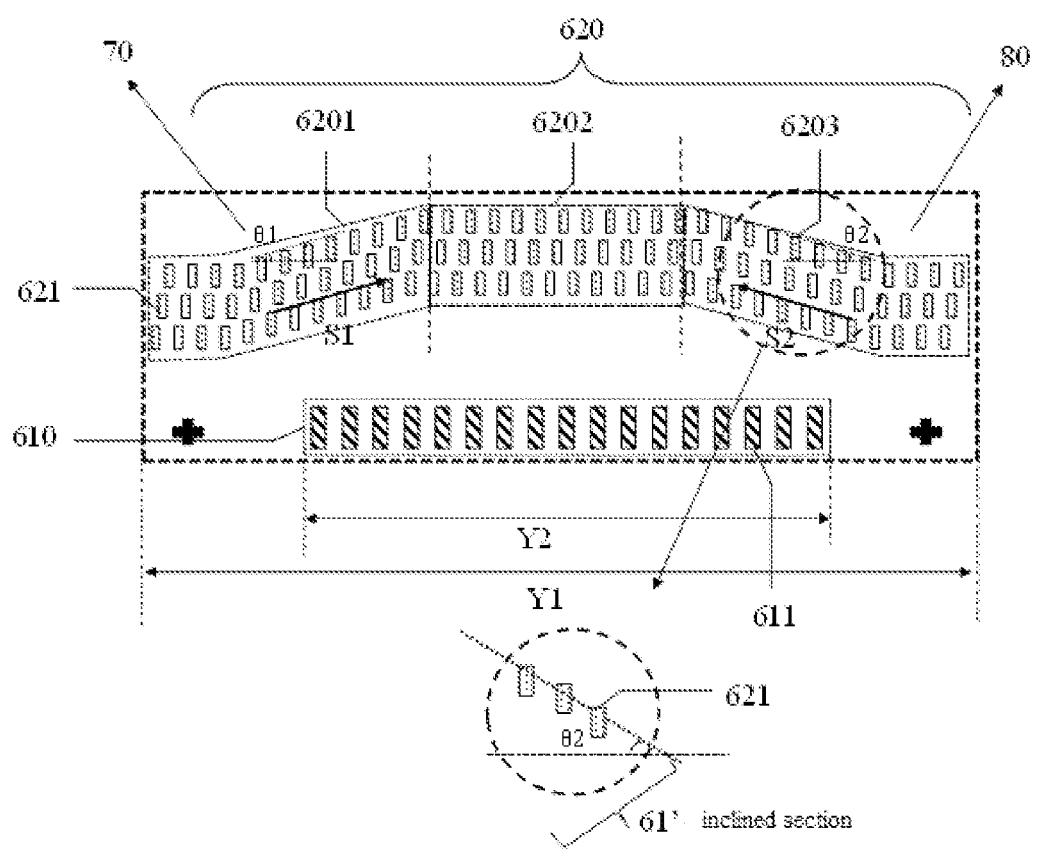
FIG. 9 is a schematic plan view illustrating an arrangement of bonding pads in a bonding region where a driving chip is to be bonded of a display panel according to yet another embodiment of the present disclosure.

FIG. 9 is a schematic plan view illustrating an arrangement of bonding pads in a bonding region where a driving chip is to be bonded of a display panel according to yet another embodiment of the present disclosure.

As shown in FIG. 9, the first pad array 620 further includes a third pad group 6203. In the second direction, the first pad group 6201 and the third pad group 6203 are provided at two sides of the second pad group 6202, respectively. Same as the first pad group 6201, the same row of first pads 621 in the third pad group 6203 may include at least one inclined section 61'. The inclined section 61' is composed of at least three first pad 621 that are sequentially arranged, and in the same inclined section 61', an included angle between the second direction and a connection line connecting a vertex of a first one of the at least three first pads 621 to a vertex of a last one of the at least three first pads 621 is defined as an inclination angle of this inclined section 61'. An included angle between the inclined section 61' in the third pad group 6203 and the second direction is an acute angle θ2.

In the present embodiment, the first pad group 6201 and the third pad group 6203 are arranged obliquely from the two ends of the second pad group 6202 in a direction facing away from the display region, respectively, and the first pads 621 in the first pad group 6201 and the third pad group 6203 as a whole are arranged obliquely in a splayed shape. For example, as shown in the figure, the at least three first pads 621 in the first pad group 6201 are arranged along the direction S1, the at least three first pads 621 in the third pad group 6203 are arranged along the direction S2, and an arrangement of the first pad group 4201 and the third pad group 4203 matches a shape of the fan-out region. Thus, intermediate oblique segments 3042 of the fan-out leads 30311 located in two side portions of the fan-out region 303 can be displaced further to a region overlapping an orthographic projection of a first blank region 70 and a second blank region 80 located at the two sides of the driving chip 400. In this way, an overall height of the fan-out region 303 and the driving chip 400 in the first direction can be reduced without changing the size of the driving chip 400, which further compresses the size of the lower border of the display panel 100, achieving a narrower lower border.

In this case, since the corresponding first terminal array 420 on the driving chip 400 is also arranged obliquely in a splayed shape, and the distance between the first terminal array 420 and the second terminal array 410 along the extension direction of the short side of the driving chip 400 still remains the vertical distance d1. In this way, compared with the manner that the first pad array 620 and the second pad array 610 are directly pulled closer to each other, the bonding pressure on the driving chip 400 is balanced, the space on the display panel 100, i.e., the gap between the first pad array 620 and the second pad example 610, can be fully used for corresponding circuit layout design, such as a test circuit.

In an embodiment, along a direction perpendicular to an extending direction of the second pad group 6202, the first pad group 6201 and the third pad group 6203 are arranged axis-symmetrically on both sides of the second pad group 6202. In this case, θ1=θ2, the first pad group 6201 and the third pad group 6203 as a whole are arranged symmetrically and obliquely in a splayed shape, and the first blank region 70 and the second blank region 80 on the two sides of the driving chip 400 have the same area. Therefore, without changing the size of the driving chip 400, along the first direction, the fan-out region 303 and the driving chip 400 overlap each other with a larger overlapping area when observed in the direction perpendicular to a surface of the display panel 100, which narrows the lower border of the display panel and providing a higher screen-to-body ratio.

Figure 10:
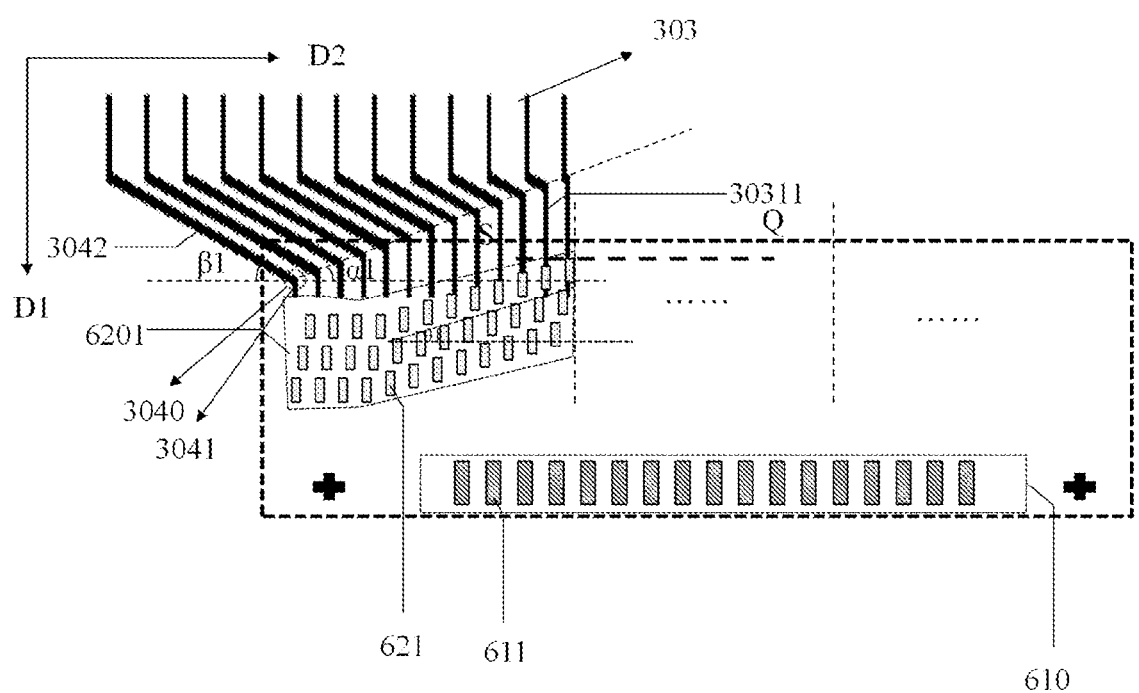
FIG. 10 is a schematic plan view illustrating a connection between a fan-out region and a driving chip of a display panel according to an embodiment of the present disclosure.

FIG. 10 is a structural schematic diagram illustrating a connection between a fan-out region and a driving chip of a display panel according to an embodiment of the present disclosure.

As shown in FIG. 10, the fan-out region 303 includes a first fan-out sub-region 3031. A plurality of first fan-out leads 30311 is provided in the first fan-out sub-region 3031. The first fan-out leads 30311 are electrically connected to corresponding first pads 621 in the first pad group 6021. The first fan-out leads 30311 in the first fan-out sub-region 3031 are sequentially arranged along the second direction. Each first fan-out lead 30311 includes at least one inflection point 3040, and each first fan-out lead 30311 further includes a straight segment 3041 extending along the first pad 621, and an oblique segment 3042 intersecting the first direction. An intersection point of the vertical segment 3041 and the oblique segment 3042 is the inflection point 3040. That is, the inflection point 3040 is formed by a connection between the vertical segment 3041 close to the first pads 621 and the oblique segment 3042, and the vertical segment 3041 of each first fan-out lead 30311 is electrically connected to a corresponding first pad. In the first fan-out sub-region 3031, an acute angle α1 is formed between the second direction and a connection line connecting at least three inflection points that are sequentially arranged, the at least three inflection points defining an arrangement trend, where 2°≤θ1≤80°.

In an embodiment, θ1 is set to be equal to α1 or differs from α1 by −5° to +5°, for example, θ1=α1±5°. In this way, the space occupied by the fan-out region 303 can be reduced, which is beneficial to narrowing the lower border. In an embodiment, the connection line of at least three sequentially arranged inflection points 3040 is parallel to the connection line of the vertexes of at least three sequentially arranged first pads 621 corresponding thereto, and in the first fan-out sub-region 3031, every two adjacent first fan-out leads 30311 are equally spaced from each other; further, the oblique segments 3042 of the at least three sequentially arranged first fan-out leads 30311 are parallel in the same direction, and an included angle β1 between the oblique segments 3042 and the second direction (i.e., the horizontal direction) satisfies β1*0.5<θ1<β1*2, such that the oblique segments 3042 of the plurality of first fan-out leads 30311 form a triangle-like fan-out shape. In this way, an equal gap between any two adjacent oblique segments 3042 is realized and the fan-out leads 30311 are insulated from each other. In addition, the space occupied by the fan-out region 303 is reduced to exactly match the blank regions between the first terminals 421 that are obliquely arranged on the driving chip 400 and the adjacent long and short sides of the driving chip, sufficiently utilizing the space.

In a further embodiment, in the first direction, among the vertexes or edges, which are closest to the display region 20, of the first pads 621 in the first pad array 620, a connection line connecting at least some of these vertexes or edges of the first pads 621 is a first connection line SQ, and the first connection line SQ extends along the second direction. At least some of the inflection points 3040 of the fan-out leads 30311 connected to the first pads 621 in the inclined section 61 are located at a side of the first connection line SQ facing away from the display region 20, so that the oblique segments 3042 of these fan-out leads 30311 close to a side edge of the display panel 100 are displaced to an area overlapping the bonding region 40 of the driving chip 400 as much as possible, reducing the overall height of the fan-out region 303 and the driving chip 400 in the first direction and narrowing the lower border of the display panel 100.

Figure 11:
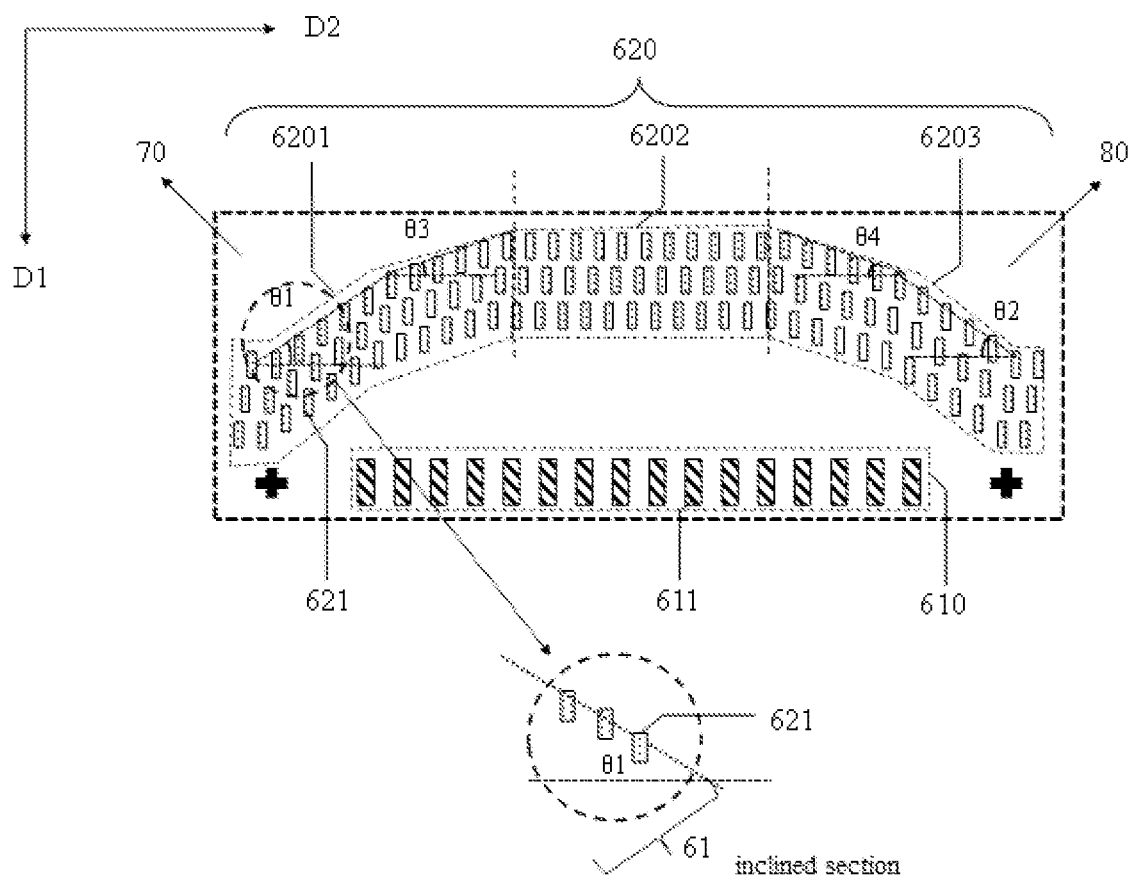
FIG. 11 is a schematic plan view illustrating an arrangement of bonding pads in a bonding region where a driving chip is to be bonded of a display panel according to yet another embodiment of the present disclosure.

FIG. 11 is a schematic plan view illustrating an arrangement of bonding pads in a bonding region where a driving chip is to be bonded of a display panel according to yet another embodiment of the present disclosure.

In the embodiment shown in FIG. 11, the first pad group 6201 may include two or more inclined sections 61, and along the second direction, the two or more inclined sections 61 are arranged successively, and two adjacent inclined sections 61 of the two or more inclined sections 61 may have different inclination angles, such as θ1 and θ3, where θ1 and θ3 may be different from each other. θ1 may be greater than or smaller than θ3, which is not limited herein. The third pad group 6203 may also include two or more inclined sections 61, and along the second direction, the two or more inclined sections 61 are arranged successively, and two adjacent inclined sections 61 of the two or more inclined sections 61 may have different inclination angles, such as θ2 and θ4, where θ2 and θ4 may be different from each other. θ2 can be greater than or smaller than θ4, which is not limited herein. That is, in each of the first pad group 6201 and the third pad group 6203, multiple inclined sections 61 are provided, and these inclined sections 61 may have different inclination angles but generally extend in the same direction. The purpose of providing the multiple inclined sections 61 is to adaptively adjust a size of the first blank region 70 and a size of the second blank region 80 shown in the figures, in order to the increase the overlapping area between the driving chip 400 and the fan-out region 303, and reduce the overall height of the driving chip 400 and the fan-out region 303 in the first direction, achieving a narrower border.

Figure 12:
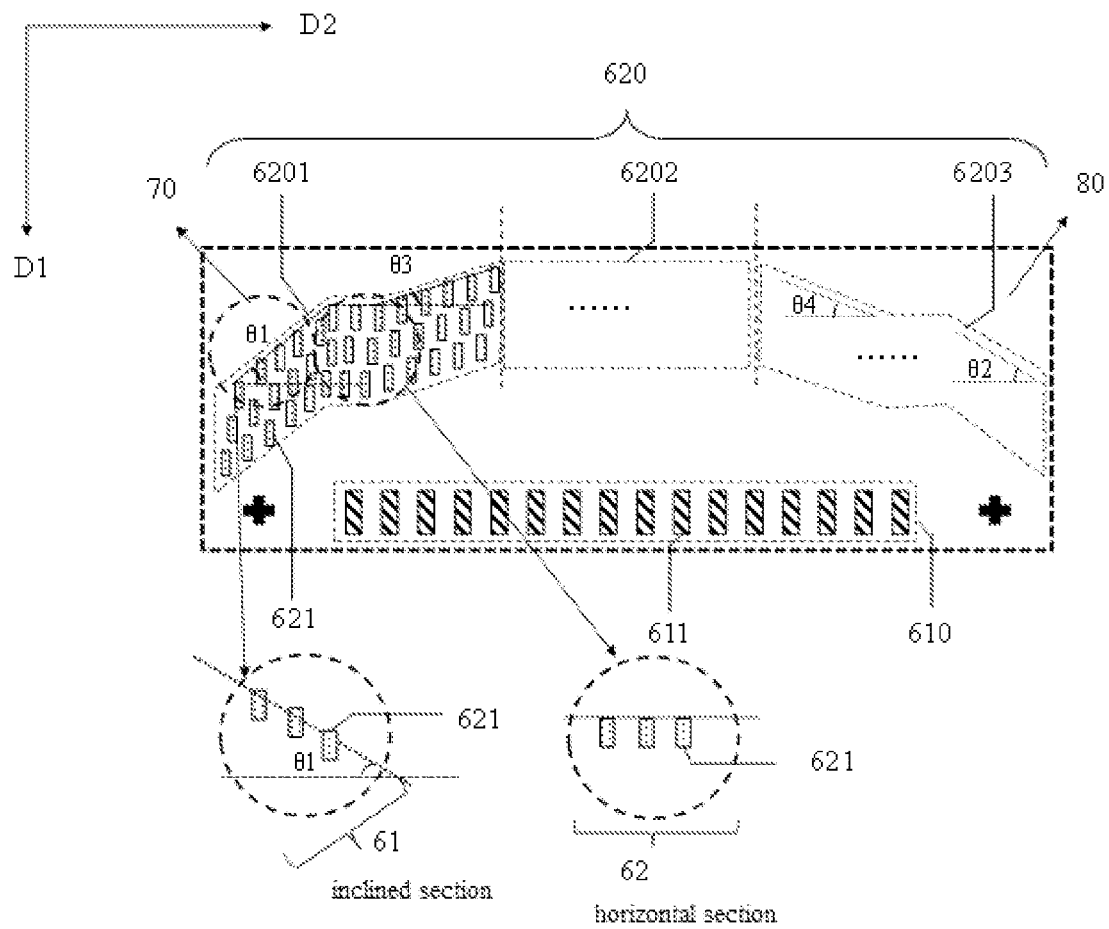
FIG. 12 is a schematic plan view illustrating an arrangement of bonding pads in a bonding region where a driving chip is to be bonded of a display panel according to yet another embodiment of the present disclosure.

FIG. 12 is a schematic plan view illustrating an arrangement of bonding pads in a bonding region where a driving chip is to be bonded of a display panel according to yet another embodiment of the present disclosure.

In the embodiment shown in FIG. 12, the first pad group 6201 may include two or more inclined sections 61, and along the second direction, the two or more inclined sections 61 are spaced apart from each other. A horizontal section 62 is provided between two adjacent inclined sections 61, and the horizontal section 62 is composed of at least two first pads 621 arranged in a sequence. A connection line connecting vertexes or midline points of the first pads 621 in the horizontal section 62 is parallel to the second direction. The two or more inclined sections 61 may have the same or different inclination angles, provided that they substantially extend in a step-like pattern in one direction, which is not limited herein. By providing the horizontal section 62 between two adjacent inclined sections 61, the gap between the first pad group 6201 and the second pad array 610 and the gap between the third pad group 6203 and the second pad array 610 can be increased, which is beneficial to increasing the layout space for the internal circuit structure of the display panel 100.

Figure 13:
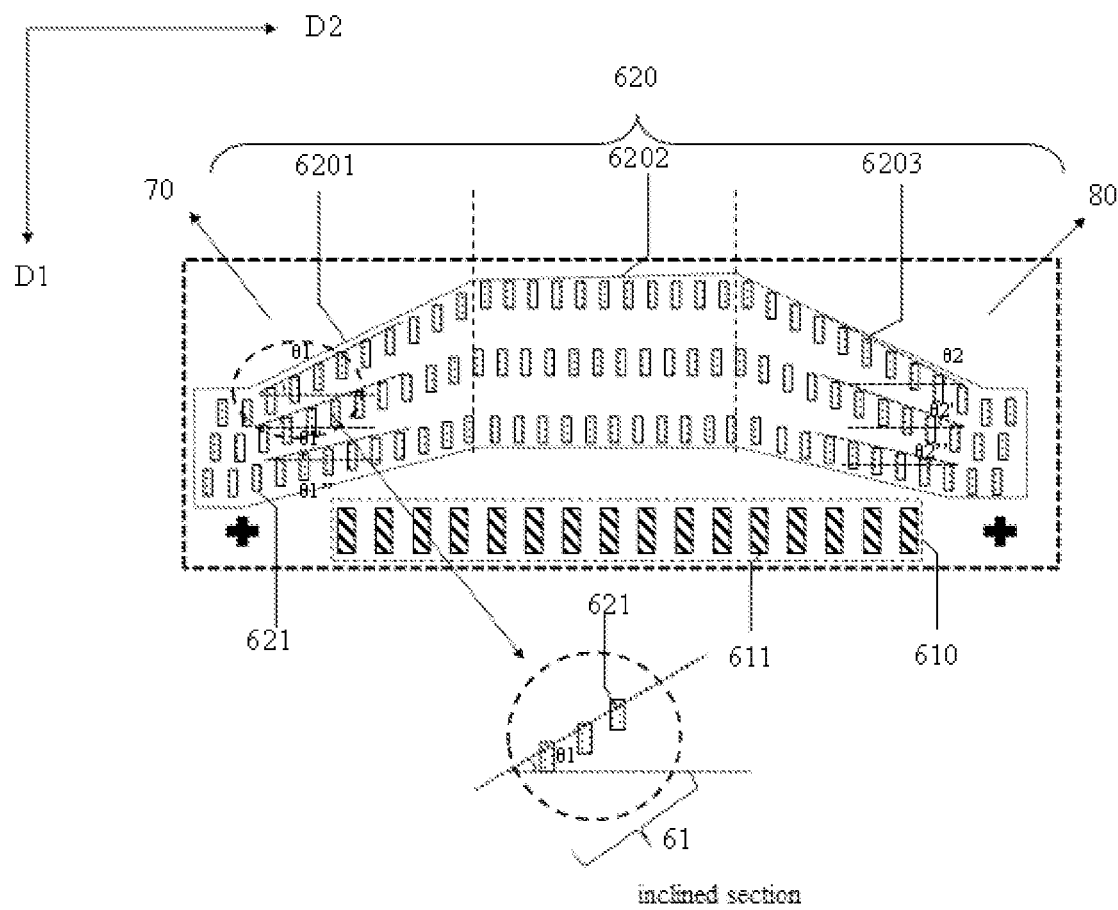
FIG. 13 is a schematic plan view illustrating an arrangement of bonding pads in a bonding region where a driving chip is to be bonded of a display panel according to yet another embodiment of the present disclosure.

FIG. 13 is a schematic plan view illustrating an arrangement of bonding pads in a bonding region where a driving chip is to be bonded of a display panel according to yet another embodiment of the present disclosure.

In the embodiment shown in FIG. 13, along the first direction, the inclination angle of one of the at least one inclined section 61 in at least one row is different from the inclination angle of one of the at least one inclined section 61 in at least another row. For example, the plurality of first pads 621 in the first pad array 620 is arranged in three rows. In the first pad group 6201, an inclination angle of an inclined section of a first row of first pads 621 is θ1, an inclination angle of an inclined section of a second row of first pads 621 is θ1', and an inclination angle of an inclined section of a third row of first pads 621 is θ1", where θ1 and θ1' are different from each other, or θ1 and θ1" are different from each other, or θ1, θ1' and θ1" are different from each other. Similarly, in the third pad group 6203, an inclination angle of an inclined section of a first row of first pads 621 is θ2, an inclination angle of an inclined section of a second row of first pads 621 is θ2', and an inclination angle of an inclined section of a third row of first pads 621 is θ2", where θ2 and θ2' are different from each other, or θ2 and θ2" are different from each other, or θ2, θ2' and θ2" are different from each other. That is, any case with a setting that an inclination angle of an inclined section in one row is different from an inclination angle of an inclined section in any other row is within the implementable scope of the present disclosure.

Figure 14:
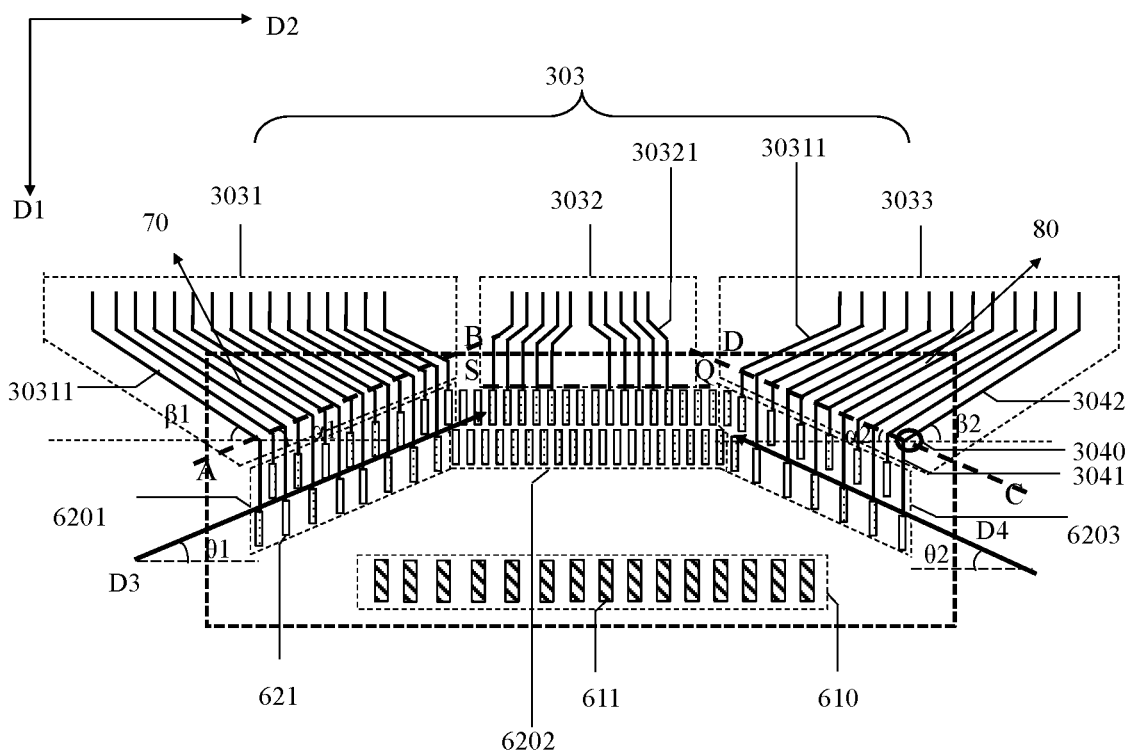
FIG. 14 is a schematic plan view illustrating a connection between a fan-out region and a driving chip of a display panel according to another embodiment of the present disclosure.

FIG. 14 is a schematic plan view of a connection between a fan-out and a driving chip of a display panel according to another embodiment of the present disclosure.

In the embodiment shown in FIG. 14, the fan-out region 303 includes a first fan-out sub-region 3031, a second fan-out sub-region 3032, and a third fan-out sub-region 3033 that are sequentially arranged in the second direction. The first fan-out sub-region 3031 and the third fan-out sub-region 3033 are located on two sides of the second fan-out sub-region 3032, respectively. A plurality of second fan-out leads 30321 is provided in the second fan-out sub-region 3032, and a plurality of first fan-out leads 30311 is provided in each of the first fan-out sub-region 3031 and the third fan-out sub-region 3033. In each of the first fan-out sub-region 3031 and the third fan-out sub-region 3033, the plurality of first fan-out leads 30311 is sequentially arranged along the second direction, and each first fan-out lead 30311 includes at least one inflection point 3040, a vertical segment 3041 extending along the first pad 621 connected thereto (e.g., along the first direction), and an oblique segment 3042 extending away from the second fan-out sub-region 3032. An intersection point between the vertical segment 3041 and the oblique segment 3042 is the inflection point 3040. The inflection point 3040 is formed by a connection between the vertical segment 3041 close to the first pad 621 and the oblique segment 3042. The inflection points 3040 of the first fan-out leads 30311 in the first fan-out sub-region 3031 are connected through a connection line, which is indicated by the connection line AB shown in FIG. 14. The inflection points 3040 of the first fan-out leads 30311 in the third fan-out sub-region 3033 are connected through a connection line, which is indicated by the connection line CD shown in FIG. 14. An included angle between the connection line AB and the second direction is an acute angle α1, and an included angle between the connection line CD and the second direction is an acute angle α2. The first pads 621 in the first pad group 6201 are arranged along a third direction D3, and an included angle between the third direction D3 and the second direction D2 is an acute angle θ1. The first pads 621 in the third pad group 6203 are arranged along a fourth direction D4, and an included angle between the fourth direction D4 and the second direction D2 is an acute angle θ2. In an embodiment, 2°≤θ1≤80°, 2°≤θ2≤80°.

In an embodiment, θ1 is set to be equal to α1 or differ from α1 by −5° to +5°, for example, θ1=α1±5°; and θ2 is set to be equal to α2 or differ from α2 by −5° to +5°, for example, θ2=α2±5°. In this way, the space occupied by the fan-out region 303 can be reduced, which is beneficial to narrowing the lower border. In an embodiment, the connection line of at least three sequentially arranged inflection points 3040 is parallel to the connection line of the vertexes of at least three sequentially arranged first pads 621 corresponding thereto, and in the first fan-out sub-region 3031 and the third fan-out sub-region 3033, every two adjacent first fan-out leads 30311 are equally spaced from each other; further, the oblique segments 3042 of the at least three sequentially arranged first fan-out leads 30311 are parallel in the same direction, so that an included angle β1 between the oblique segments 3042 in the first fan-out sub-region 3031 and the horizontal direction satisfies β1*0.5<θ1<β1*2, and an included angle β2 between the oblique segments 3042 in the third fan-out sub-region 3033 and the horizontal direction satisfies β2*0.5<θ2<β2*2. In this way, the oblique segments 3042 of the plurality of first fan-out leads 30311 in each of the first fan-out sub-region 3031 and the third fan-out sub-region 3033 form a triangle-like fan-out shape. Therefore, an equal gap between any two adjacent oblique segments 3042 is realized and the fan-out leads 30311 are insulated from each other. In addition, the space occupied by the fan-out region 303 is reduced to exactly match the blank regions between the first terminals 421 that are obliquely arranged on the driving chip 400 and the adjacent long and short sides of the driving chip, sufficiently utilizing the space.

In a further embodiment, in the first direction, among the vertexes or edges, which are closest to the display region 20, of the first pads 621 in the first pad array 620, a connection line connecting at least some of these vertexes or edges of the first pads 621 is a first connection line SQ, and the first connection line SQ extends along the second direction. At least some of the inflection point 3040 of the fan-out leads 30311 connected to the first pads 621 in the inclined section 61 are located at a side of the first connection line SQ facing away from the display region 20.

With such an arrangement, in the first fan-out sub-region 3031 and the third fan-out sub-region 3033, the vertical segments 3041 of the first fan-out leads 30311 electrically connected to the first pads 621 in the same row have substantially same lengths, the oblique portions 3042 of the fan-out leads 30311 close to two side edges of the display panel 100 are displaced as much as possible to an area overlapping the first bland region 70 and the second blank region 80 at the two side of the driving chip 400, which reduces the spatial area occupied by the first fan-out sub-region 3031 and the third fan-out sub-region 3033 and reduces the overall height of the fan-out region 303 and the driving chip 400 in the first direction, narrowing the lower border of the display panel 100.

Figure 15:
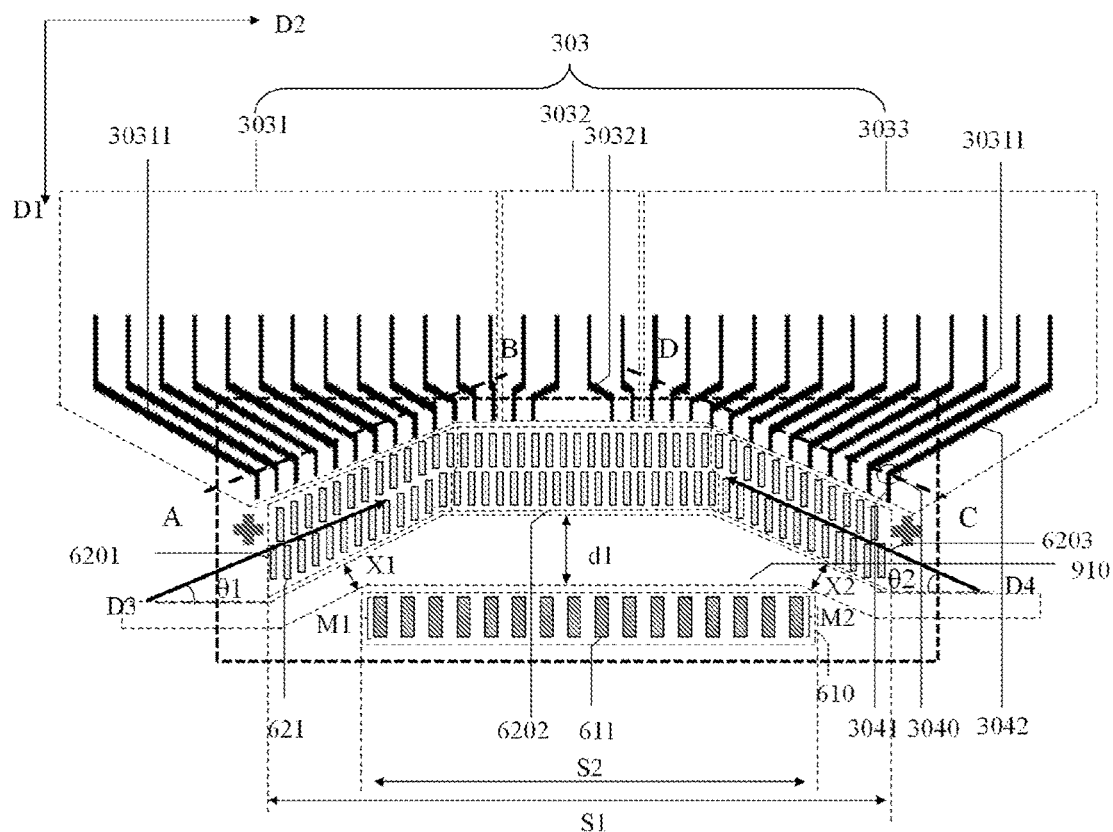
FIG. 15 is a schematic plan view illustrating a connection between a fan-out region and a driving chip of a display panel according to yet another embodiment of the present disclosure.
Figure 16:
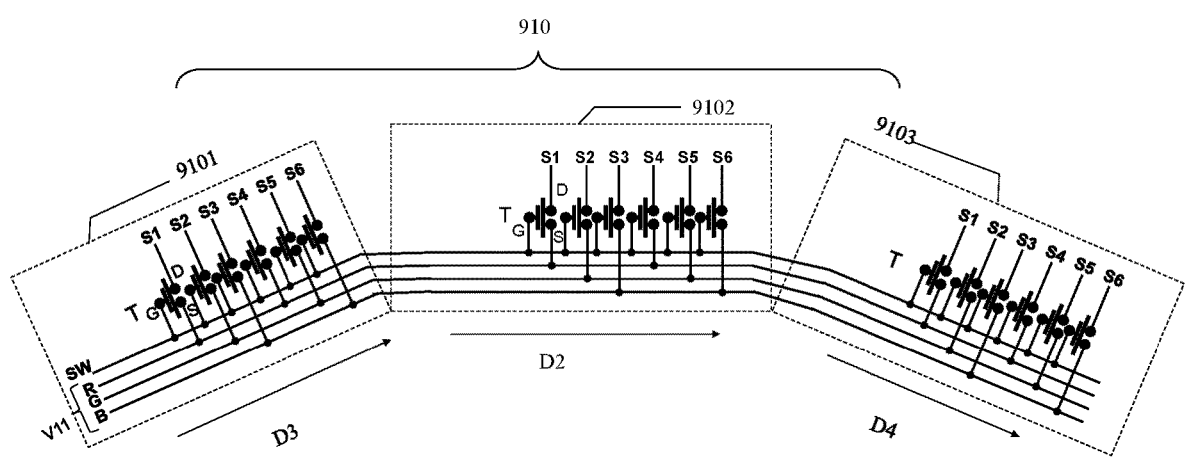
FIG. 16 is an enlarged view of a test circuit in FIG. 15.
Figure 17:
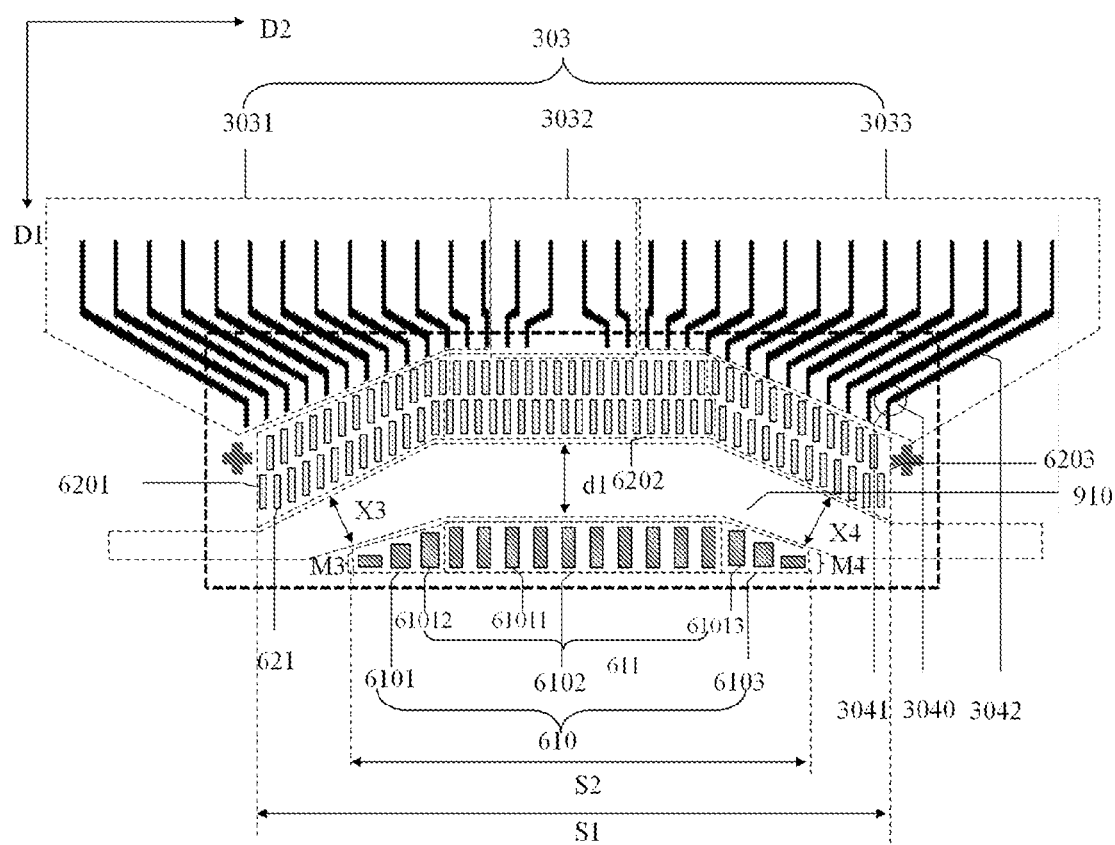
FIG. 17 is a schematic plan view illustrating a connection between a fan-out region and a driving chip in a display panel according to yet another embodiment of the present disclosure.

FIG. 15 is a schematic plan view of a connection between a fan-out region and a driving chip of a display panel according to yet another embodiment of the present disclosure, FIG. 16 is an enlarged view of a detection circuit in FIG. 15, and FIG. 17 is a schematic plan view of a connection between a fan-out region and a driving chip of a display panel according to yet another embodiment of the present disclosure.

As shown in FIG. 15 and FIG. 16, the display panel 100 provided by the embodiment of the present disclosure further includes a detection circuit 910. The detection circuit 910 of the display panel 100 is placed in the gap between the first pad array 620 and the second pad array 610 to facilitate testing of internal circuit signals of the display panel 100 before the driving chip 400 is bonded while providing a high space utilization rate. In addition, by testing the display panel 100 before the driving chip 400 is bonded, a wasting of processes can be avoided and a product qualification rate of the display panel can be enhanced.

In an embodiment, a projection length S1 of the first pad array 620 in the second direction is greater than a projection length S2 of the second pad array 610 in the second direction.

The second pad array 610 includes a first end M1 and a second end M2 that are opposite to each other along the second direction. The first end M1 and the second end M2 are two outermost sides of two second pads 611 located on two sides of the second pad array 610, respectively. As the vertical distance d1 between the second pad group 6202 and the second pad array 610 is greater than or equal to 100 µm, the detection circuit 910 can be placed in the space between the first pad array 620 and the second pad array 610. A distance X1 between the first end M1 and an oblique line segment as a side edge of the first pad group 6201 closest to the first end M1 is greater than 0, and a distance X2 between the second end M2 and an oblique line segment as a side edge of the third pad group 6203 closest to the second end M2 is greater than 0. In this way, a gap is formed between the first end M1 and the oblique line segment in the first pad group 6201, and a gap is formed between the second end M2 and the oblique line segment in the third pad group 6203, to jointly form a channel for increasing the space where the detection circuit 910 is placed, increasing the space utilization rate. Thus, the detection circuit 910 completely fall within the orthographic projection of the driving chip 400 on the display panel 100. Since the driving chip 400 is bonded in bonding region 40 through an ACF adhesive, after the ACF glue is cured, a complete sealed space can be formed between first pad array 620 and second pad array 610 to isolate the external water vapor and protect the detection circuit 910 on the display panel 100 from being corroded.

As shown in FIG. 16, in an embodiment of the present disclosure, the detection circuit 910 includes at least one detection circuit device 9101, and each of the at least one detection circuit device 9101 includes switch transistors T for electrical connections. Each switch transistor has a gate electrode G connected to a switch control signal line SW, and a source electrode S connected to a reference voltage line V11. A least three reference voltage lines V11 is provided. For example, three reference voltage lines V11 are provided and the three reference voltage lines V11 are electrically connected to a red test data signal source R, a green test data signal source G, and a blue test data signal source B, respectively. A drain electrode D of each switch transistor T is connected to a first pad 621, and the first pad 621 is electrically connected to a corresponding fan-out lead 30311. The same signal lines of the detection circuit devices are electrically connected to each other. In an embodiment, the signal lines between two adjacent detection circuits can be electrically connected to each other via their own metal wirings or other conducting wirings, or via connection lines that are additionally provided for electrical connection, which will not be described in detail herein.

In an embodiment, the detection circuit 910 includes a first detection circuit device 9101, a second detection circuit device 9102, and a third detection circuit device 9103. The first detection circuit device 9101 is arranged along the third direction D3, the second detection circuit device 9102 is arranged along the second direction D2, and the third detection circuit device 9103 is arranged along the fourth direction D4. It should be noted that the first detection circuit device 9101 is arranged along the third direction, and an included angle between the third direction and the second direction an acute angle. The third direction may be the same as the extension direction of one inclined section 61 in the first pad group 6201. In an embodiment, the first pad group 6201, as a whole, is obliquely arranged along the third direction, and the first detection circuit device 9101 is also arranged along the third direction. The second detection circuit device 9102 is arranged along the second direction, i.e., in parallel with the second pad group 6202. The third detection circuit device 9103 is arranged along the fourth direction, and an included angle between the fourth direction and the second direction is an acute angle. The fourth direction can be the same as the extension direction of one inclined section 61 in the third pad group 6203. In an embodiment, the third pad group 6203, as a whole, is obliquely arranged along the fourth direction, and the third detection circuit device 9103 is also arranged along the fourth direction.

As shown in FIG. 17, along the second direction, the second pad array 610 includes a fourth pad group 6101, a fifth pad group 6102, and a sixth pad group 6103. The fourth pad group 6101 and the sixth pad group 6103 are located on two sides of the fifth pad group 6102. Among the second pads 611 in the same row, in the fourth pad group 6101 and the sixth pad group 6103, or in any one of the fourth pad group 6101 and in the sixth pad group 6103, one second pad 611 has a greater length than another second pad 611 that is farther from the fifth pad group 6102 than the one second pad 611.

In an embodiment, the second pads 611 include first sub-pads 61011, second sub-pads 61012, and third sub-pads 61013, and the first sub-pads 61011 are located in the fifth pad group 6102, the second sub-pads 61012 are located in the fourth pad group 6101, and the third sub-pads 61013 are located in the sixth pad group 6103. Along the first direction, the length of each second sub-pad 61012 is smaller than the length of each first sub-pad 61011, and for the second sub-pads 61012, one second sub-pad 61012 has a greater length than another second sub-pad 61012 that is farther from the fifth pad group 6102 than the one second sub-pad 61012. An orthographic projection of each second sub-pad 61012 on the display panel 100 has the same area as an orthographic projection of each first sub-pad 61011 on the display panel 100, ensuring the same signal load of the first sub-pad 61011 and the second sub-pad 61021. Similarly, for the third sub-pads 61013, one third sub-pad 61013 has a greater length than another third sub-pad 61013 that is farther from the fifth pad group 6102 than the one third sub-pad 61013, and an orthographic projection of each third sub-pad 61013 on the display panel 100 has the same area as an orthographic projection of each first sub-pad 61011 on the display panel 100, ensuring the same signal load of the first sub-pad 61011 and the third sub-pad 61013.

The second pad array 610 includes a third end M3 and a fourth end M4 that are opposite to each other along the second direction. The third end M3 and the fourth end M4 are the outermost sides of two second pads 611 located on two sides of the second pad array 610, respectively. A distance X3 between the third end M3 and an oblique line segment as a side edge of the first pad group 6201 closest to the third end M3 is greater than 0, and a distance X4 between the fourth end M4 and an oblique line segment as a side edge of the third pad group 6203 closest to the fourth end M3 is greater than 0. Compared with FIG. 15, it can be seen that X3 is greater than X1, and X4 is greater than X2. The setting that the lengths of the second pads 611 gradually decrease towards two sides of the bonding region 40 increases the distances X3 and X4, and increases the area between the first pad array 610 and the second pad array 620, which is beneficial to increasing the layout space of the wirings of the detection circuit 910.

In an embodiment, a projection length S1 of the first pad array 620 in the second direction is greater than a projection length S2 of the second pad array 610 in the second direction, providing more space for placing the detection circuit while effectively utilizing the space of the bonding region 40 where the driving chip 400 is bonded.

Figure 18:
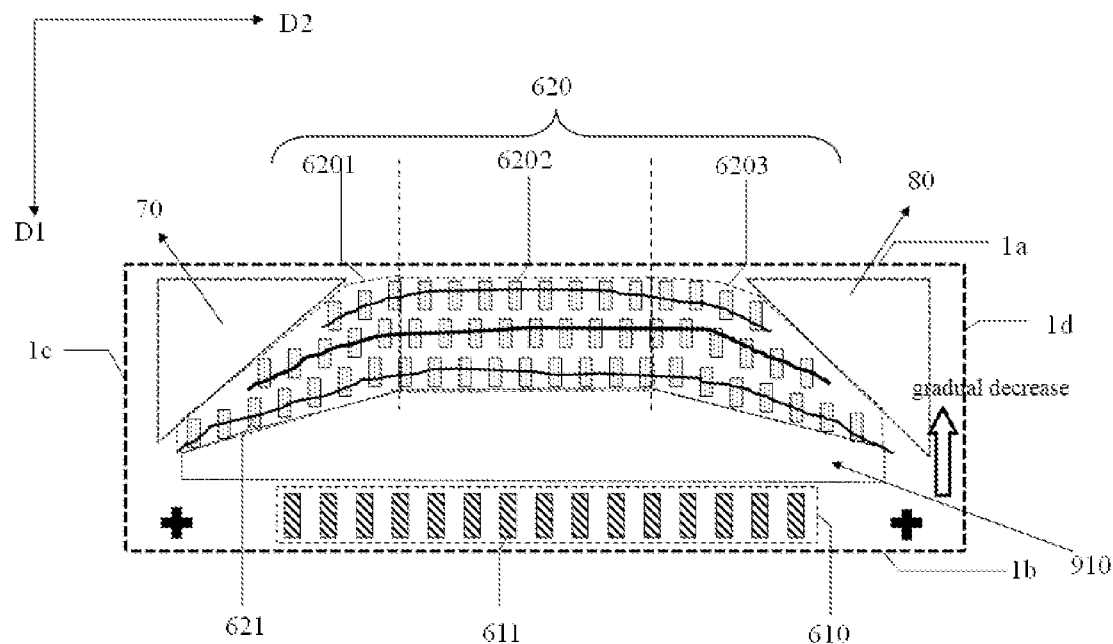
FIG. 18 is a schematic plan view illustrating an arrangement of bonding pads in a bonding region where a driving chip is to be bonded of a display panel according to yet another embodiment of the present disclosure.

FIG. 18 is a schematic plan view illustrating an arrangement of bonding pads in a bonding region where a driving chip is to be bonded of a display panel according to yet another embodiment of the present disclosure.

As shown in FIG. 18, the number of the first pads 621 decreases row by row in a direction from the non-display region 10 towards the display region 20. When the driving chip 400 is bonded to the non-display region of the display panel, the number of the first pads 621 in the rows of the first pad array 620 decreases row by row in a direction facing towards a first edge 1a of the driving chip 400, and therefore the first blank region 70 and the second blank region 80 having larger areas are formed on the driving chip 400, to facilitate the placement of part of the fan-out region 303 in these regions in an overlapping manner and further narrow the boarder of the display panel 100.

Figure 19:
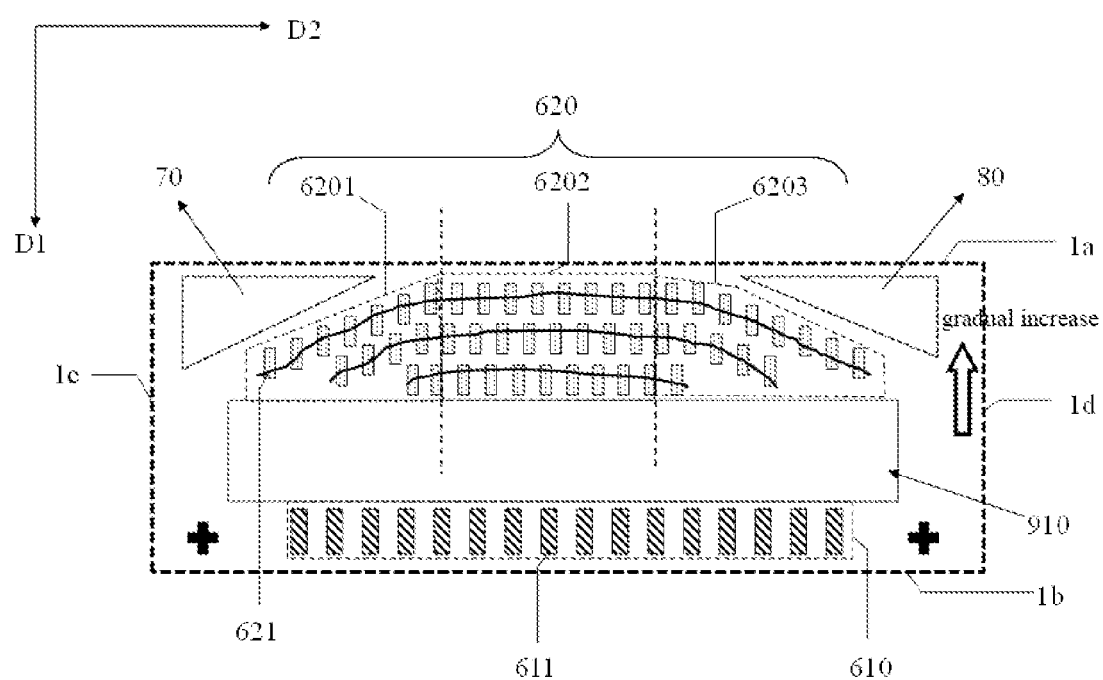
FIG. 19 is a schematic plan view illustrating an arrangement of bonding pads in a bonding region where a driving chip is to be bonded in a display panel according to yet another embodiment of the present disclosure.

FIG. 19 is a schematic plan view illustrating an arrangement of bonding pads in a bonding region where a driving chip is to be bonded of a display panel according to yet another embodiment of the present disclosure.

As shown in FIG. 19, the number of the first pads 621 increases row by row in a direction from the non-display region 10 towards the display region 20. When the driving chip 400 is bonded to the non-display region of the display panel, the number of the first pads 621 in the rows of the first pad array 620 increases row by row in a direction facing towards a first edge 1a of the driving chip 400. In this way, the gap between the first pad array 620 and the second pad array 610 can be increased, while providing sufficient areas of the first blank region 70 and the second blank region 80. Further, the first pads at a side of the first pad array 620 close to the second pad array 610 are flush with each other, and thus a rectangular blank region is formed between the first pad array 620 and the second pad array 610, which is convenient for the placement of the detection circuit 910 on the display panel 100. The detection circuit 910 may be arranged to extend along the second direction without being inclined or bent, simplifying the circuit design.

As shown in FIG. 18 and FIG. 19, along the first direction, a number of first pads 621 in at least one row is different from a number of first pads 621 in at least another row, i.e., at least two rows of the first pad array 620 have different numbers of first pads 621. For example, a case where only one row in the first pad array 620 has a different number of first pads 621 from the other rows in the first pad array 620, and each of the first pad group 6201 and the third pad group 6203 in the first pad array 620 has at least one inclined section 61 is also implementable, without requiring that each row has the inclined section 61.

Figure 20:
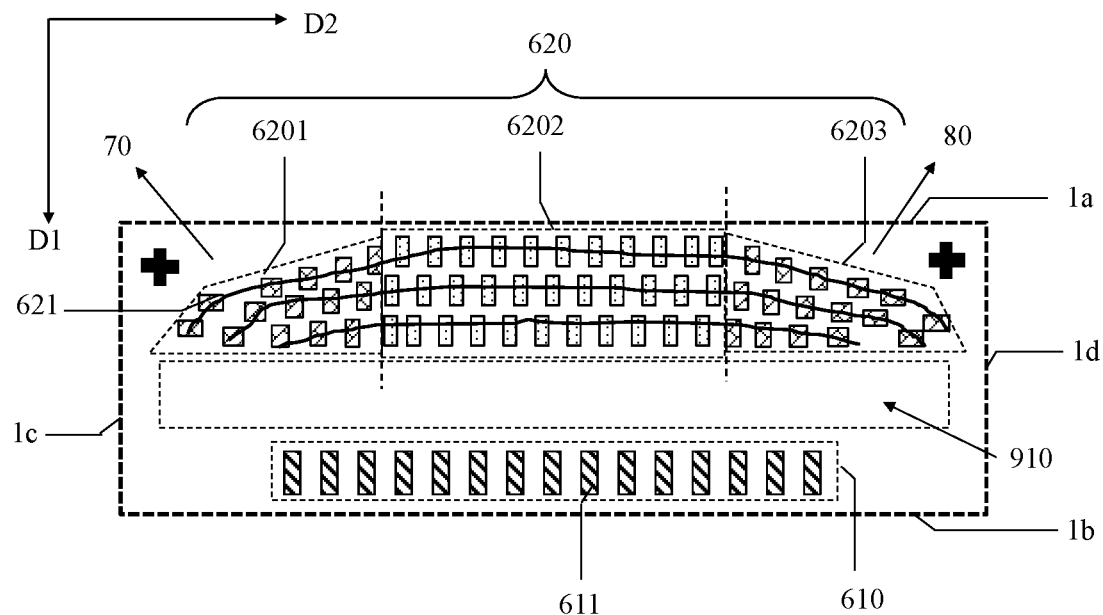
FIG. 20 is a schematic plan view illustrating an arrangement of bonding pads in a bonding region where a driving chip is to be bonded in a display panel according to yet another embodiment of the present disclosure.

FIG. 20 is a schematic plan view illustrating an arrangement of bonding pads in a bonding region where a driving chip is to be bonded of a display panel according to yet another embodiment of the present disclosure.

As shown in FIG. 20, in this embodiment, the lengths of the first pads 621 in the first pad array 620 in the first direction is no longer completely equal to each other. Along the second direction, for first pads 621 of each of the at least one inclined section 61 in the same row in the first pad group 6201 and in the third pad group 6203, one first pad 621 has a greater length than another first pad 621 that is farther from the second pad group 6202 than the one first pad 621. When the driving chip 400 is bonded to a center of the lower border of the display panel 100, the lengths of the first pads 621 gradually decreases from the center of the driving chip 400 to the left and right sides along the second direction, but the first pads 621 still have equal areas, and a contact area between each first pad 621 and the first terminal 421 on the driving chip 400 is identical, which avoids the problem of poor contact or bonding failure between the first pad 621 and the driving chip 400. As shown in FIG. 19, a pitch between two adjacent first pads 621 in the same row gradually increases towards both sides. That is, a distribution density of the first pads 621 gradually decreases along a direction toward the two sides of the driving chip 400. Such a design also enables the first pads at a side of the first pad array 620 close to the second pad array 610 to be flush with each other, and a rectangular blank region can be formed between the first pad array 620 and the second pad array 610. Therefore, when placing the detection circuit 910 of the display panel 100 in this rectangular blank region, the detection circuit 910 can be arranged along the second direction without being inclined or bent, simplifying the circuit design.

Figure 21:
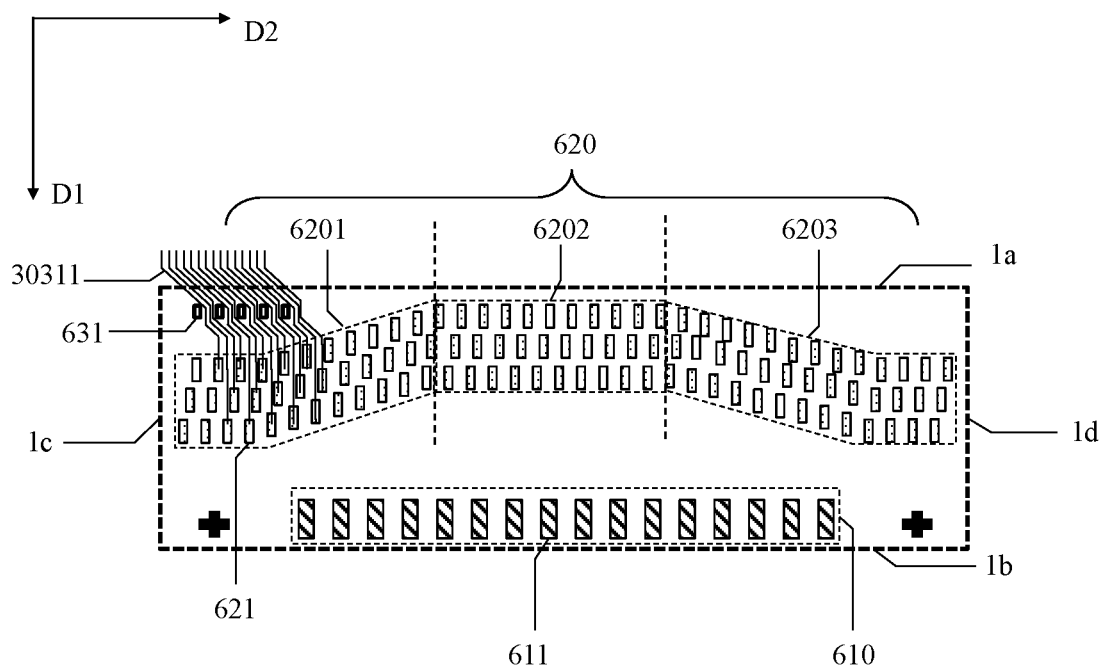
FIG. 21 is a schematic plan view illustrating an arrangement of bonding pads in a bonding region where a driving chip is to be bonded and an arrangement of fan-out leads in a display panel according to yet another embodiment of the present disclosure.

FIG. 21 is a schematic plan view illustrating an arrangement of bonding pads in a bonding region where a driving chip is to be bonded and an arrangement of fan-out leads of a display panel according to yet another embodiment of the present disclosure.

As shown in FIG. 21, the display panel 100 further includes a plurality of dummy pads 631, and correspondingly, a plurality of dummy terminals (not shown) is provided on the driving chip 400. The plurality of dummy pads 631 is provided in the blank regions at both sides of the bonding region, in order to overcome the problem of imbalance of the pressing pressure on both sides of the driving chip 400 when the driving chip 400 is bonded to the display panel. In an embodiment, the plurality of dummy pads 631 is located in the first blank region 70 and/or second blank region 80. In an embodiment, each dummy pad 631 does not overlap the fan-out lead 30311, and each dummy pad 631 is located in the area between two adjacent fan-out leads 30311.

In an embodiment, in a direction perpendicular to the plane of the driving chip 400, the plurality of dummy terminals (not shown), the first terminals 421, and the second terminals 411 have metal bumps of equal height. In this way, the dummy terminals (not shown), the first terminals 421, and the second terminals 411 are subjected to the same pressure due to the equal height of the metal bumps. As no signal is transmitted inside the plurality of dummy terminals 431, these dummy terminals 431 are suspending electrodes, and thus it is unnecessary to separately apply insulation adhesive thereon for electrical signal insulation when bonding.

Figure 22:
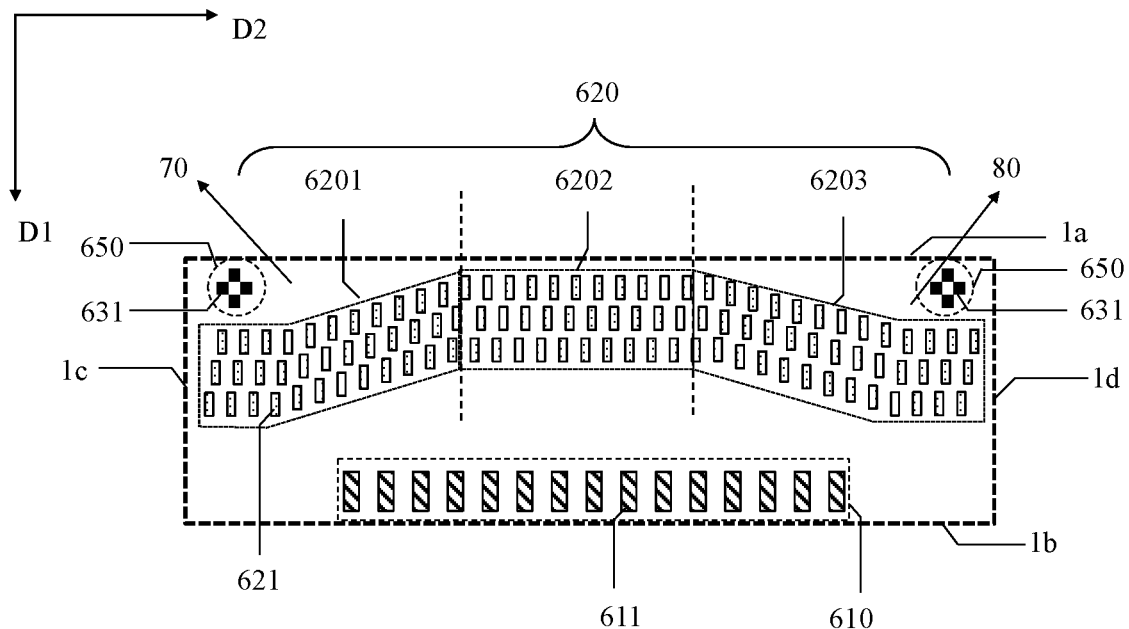
FIG. 22 is a schematic plan view illustrating an arrangement of bonding pads in a bonding region where a driving chip is to be bonded in a display panel according to yet another embodiment of the present disclosure.
Figure 23:
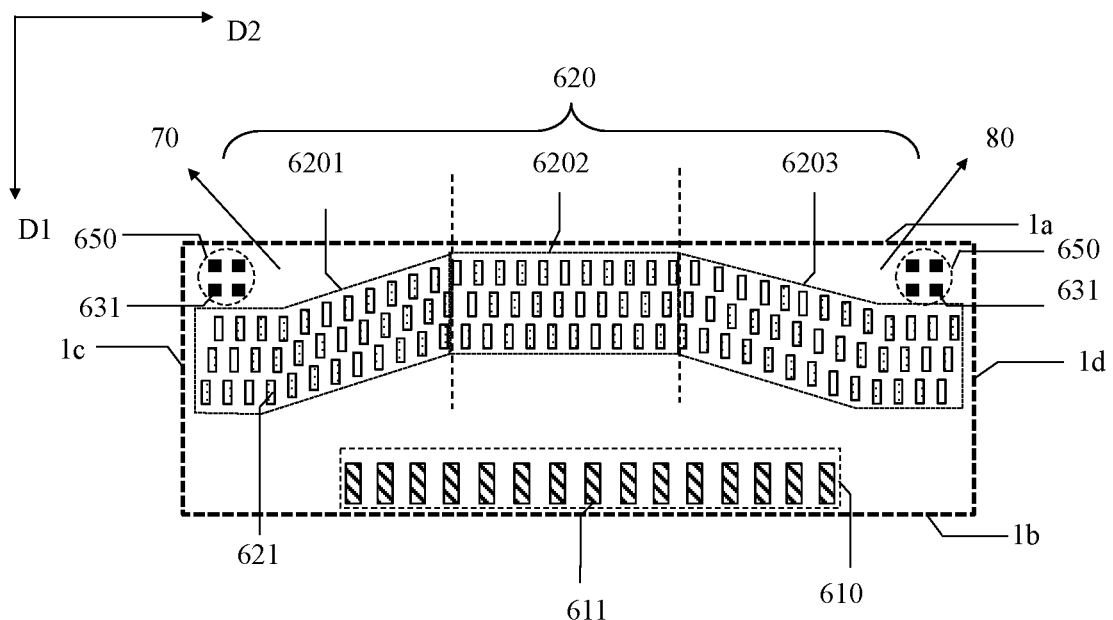
FIG. 23 is a schematic plan view illustrating an arrangement of bonding pads in a bonding region where a driving chip is to be bonded in a display panel according to yet another embodiment of the present disclosure.

FIG. 22 is a schematic plan view illustrating an arrangement of bonding pads in a bonding region where a driving chip is to be bonded of a display panel according to yet another embodiment of the present disclosure, and FIG. 23 is a schematic plan view illustrating an arrangement of bonding pads in a bonding region where a driving chip is to be bonded of a display panel according to yet another embodiment of the present disclosure.

As shown in FIGS. 22 and 23, in an embodiment, at least one dummy pad is reused as an alignment mark for the driving chip. As shown in FIGS. 22 and 23, the alignment mark 650 is composed of multiple dummy pads 631. In FIG. 22, four dummy pads 631 are spliced to form a cross-shaped mark pattern, and accordingly, a cross-shaped hollow pattern corresponding to the cross-shaped mark pattern may be defined in the driving chip 400 so that the cross-shaped mark pattern on the display panel 100 can be aligned with and embedded into the cross-shaped hollow pattern in the driving chip 400. Four dummy pads 631 form a cross-shaped mark pattern with a hollow center in FIG. 23, and accordingly, a cross-shaped mark pattern corresponding to the cross-shaped mark pattern may be formed on driving chip 400 so that the cross-shaped mark pattern on the driving chip 400 can be aligned with and embedded into the cross-shaped hollow pattern in the display panel 100. However, the present disclosure is not limited to these two embodiments.

An embodiment of the present disclosure provides a display apparatus including the display panel as described above. The display apparatus may be display devices, such as a liquid crystal display, a liquid crystal display screen, a liquid crystal television, etc., or mobile devices, such as a mobile phone, a tablet computer, or a notebook.

In view of the above description, the embodiments of the present disclosure bring at least the following beneficial effects.

In the display panel of the present disclosure, the display panel includes the bonding region where the driving chip is bonded and a fan-out region; the fan-out region includes the plurality of fan-out leads; the plurality of bonding pads located in the bonding region includes the first pad array and the second pad array, the first pad array is located on the side of the second pad array close to the display region, the first pad array includes the plurality of first pads arranged in at least two rows; the signal lines in the display panel are electrically connected to the first pads via the fan-out leads; and the first pad array includes at least one inclined section, and the inclined section includes at least three first pads that are sequentially and obliquely arranged away from the display region. Such an arrangement allows at least a portion of the fan-out lead to be displaced into the bonding region, to increase the area for arranging the fan-out leads. In this way, the fan-out region overlaps the bonding region in the first direction, which reduces the overall height of the fan-out region and the driving chip in the first direction, narrowing the lower border of the display panel and achieving the higher screen-to-body ratio.

What is claimed is:

1. A display panel having a display region and a non-display region surrounding the display region, the non-display region comprising a bonding region and a fan-out region, the display panel comprising:
a plurality of signal lines extending along a first direction and arranged along a second direction in the display region, the first direction intersecting with the second direction;
a driving chip bonded in the bonding region;
a plurality of bonding pads provided in the bonding region; and
a plurality of fan-out leads provided in the fan-out region,
wherein the plurality of bonding pads comprises a first pad array and a second pad array, the first pad array being located at a side of the second pad array close to the display region,
wherein the first pad array comprises a plurality of first pads arranged in at least two rows, and the plurality of signal lines is electrically connected to the plurality of first pads via the plurality of fan-out leads,
wherein the second pad array comprise a plurality of second pads arranged in at least one row, and the plurality of second pads is electrically connected to corresponding signal pins on a flexible circuit board,
wherein the first pad array comprises a first pad group, wherein first pads in a same row in the first pad group comprises at least one inclined section each composed of at least three first pads that are sequentially arranged, and wherein in one of the at least one inclined section, an included angle between the second direction and a connection line connecting a vertex of a first one of the at least three first pads with a vertex of a last one of the at least three first pads is defined as an inclination angle of the one inclined section, and the inclination angle is an acute angle θ1;
wherein the fan-out region comprises a first fan-out sub-region,
the plurality of fan-out leads comprises a plurality of first fan-out leads arranged in the first fan-out sub-region,
each of the plurality of first fan-out leads is electrically connected to a corresponding first pad in the first pad group,
the plurality of first fan-out leads is sequentially arranged along the second direction,
each of the plurality of first fan-out leads comprises at least one inflection point, a vertical segment extending along the first direction, and an oblique segment intersecting the first direction, wherein an intersection point between the vertical segment and the oblique segment is one of the at least one inflection point, and
the vertical segment of each of the plurality of first fan-out leads is electrically connected to the corresponding first pad, wherein an included angle between the second direction and a connection line connecting inflection points of at least three first fan-out leads that are sequentially arranged in the first fan-out sub-region is an acute angle α1, where θ1=α1±5°, and 2°≤θ1≤80°; and
wherein a projection of the at least one inflection point of at least one first fan-out lead of the plurality of first fan-out leads on the display panel is within a projection of the driving chip on the display panel.

2. The display panel according to claim 1, wherein the driving chip has two opposite long sides and two opposite short sides;
the driving chip comprises a first terminal array and a second terminal array, the first terminal array comprises a plurality of first terminals arranged in at least two rows, and the second terminal array comprises a plurality of second terminals arranged in at least one row,
the plurality of first terminals is electrically connected to the plurality of first pads in one-to-one correspondence, and the plurality of second terminals is electrically connected to the plurality of second pads in one-to-one correspondence.

3. The display panel according to claim 2, wherein the first pad array further comprises a second pad group located a side of the first pad group in the second direction; and
the second pad group and the second pad array are opposite to each other in the first direction.

4. The display panel according to claim 3, wherein the first pad array further comprises a third pad group, and the first pad group and the third pad group are located at two sides of the second pad group in the second direction, respectively.

5. The display panel according to claim 4, wherein the first pad group and the third pad group are arranged obliquely in a direction away from the display region from two ends of the second pad group, respectively; and
first pads in a same row in the third pad group comprises at least one inclined section each composed of at least three first pads that are sequentially arranged, wherein in each of the at least one inclined section, an included angle between the second direction and a connection line connecting a vertex of a first one of the at least three first pads to a vertex of a last one of the at least three first pads is defined as an inclination angle of the one inclined section, and the inclination angle is an acute angle θ2.

6. The display panel according to claim 5, wherein first pads in a same row in each of the first pad group and the third pad group comprise at least two inclined sections.

7. The display panel according to claim 6, wherein along the second direction, the at least two inclined sections are spaced apart from each other, and a horizontal section is provided between two adjacent inclined sections of the at least two inclined sections,
wherein the horizontal section is composed of at least two first pads that are sequentially arranged, and a connection line connecting vertexes or midline points of the at least two first pads in the horizontal section is parallel to the second direction.

8. The display panel according to claim 5, wherein along the first direction, the inclination angle of one of the at least one inclined section in at least one row is different from the inclination angle of one of the at least one inclined section in at least another row.

9. The display panel according to claim 5, wherein along a direction perpendicular to an extending direction of the second pad group, the first pad group and the third pad group are arranged axis-symmetrically on two sides of the second pad group.

10. The display panel according to claim 2, further comprising:
a plurality of dummy pads provided in the bonding region, and
a plurality of dummy terminals provided on the driving chip,
wherein the plurality of dummy pads is correspondingly bonded to the plurality of dummy terminals.

11. The display panel according to claim 10, wherein in a direction perpendicular to a plane of the display panel, an orthographic projection of each of the plurality of dummy pads is located in a gap between orthographic projections of two adjacent fan-out leads of the plurality of fan-out leads.

12. The display panel according to claim 1, wherein in the first direction, the first pad array comprises vertexes or edges of the first pads closest to the display region, a connection line connecting at least some of the vertexes or edges of the first pads is a first connection line, and the first connection line extends along the second direction; and
at least some of inflection points of the plurality of first fan-out leads are located at a side of the first connection line facing away from the display region.

13. A display panel having a display region and a non-display region surrounding the display region, the non-display region comprising a bonding region and a fan-out region, the display panel comprising:
a plurality of signal lines extending along a first direction and arranged along a second direction in the display region, the first direction intersecting with the second direction;
a driving chip bonded in the bonding region;
a plurality of bonding pads provided in the bonding region; and
a plurality of fan-out leads provided in the fan-out region, wherein the plurality of bonding pads comprises a first pad array and a second pad array, the first pad array being located at a side of the second pad array close to the display region,
wherein the first pad array comprises a plurality of first pads arranged in at least two rows, and the plurality of signal lines is electrically connected to the plurality of first pads via the plurality of fan-out leads,
wherein the second pad array comprise a plurality of second pads arranged in at least one row, and the plurality of second pads is electrically connected to corresponding signal pins on a flexible circuit board,
wherein the first pad array comprises a first pad group, wherein first pads in a same row in the first pad group comprises at least one inclined section each composed of at least three first pads that are sequentially arranged, and wherein in one of the at least one inclined section, an included angle between the second direction and a connection line connecting a vertex of a first one of the at least three first pads with a vertex of a last one of the at least three first pads is defined as an inclination angle of the one inclined section, and the inclination angle is an acute angle θ1;
wherein the first pad array further comprises a second pad group located a side of the first pad group in the second direction, and the second pad group and the second pad array are opposite to each other in the first direction;
wherein the first pad array further comprises a third pad group, and the first pad group and the third pad group are located at two sides of the second pad group in the second direction, respectively;
the first pad group and the third pad group are arranged obliquely in a direction away from the display region from two ends of the second pad group, respectively;
first pads in a same row in the third pad group comprises at least one inclined section each composed of at least three first pads that are sequentially arranged, wherein in each of the at least one inclined section, an included angle between the second direction and a connection line connecting a vertex of a first one of the at least three first pads to a vertex of a last one of the at least three first pads is defined as an inclination angle of the one inclined section, and the inclination angle is an acute angle θ2;
first pads in a same row in each of the first pad group and the third pad group comprise at least two inclined sections; and
wherein along the second direction, the at least two inclined sections are successively arranged, and two adjacent inclined sections of the at least two inclined sections have different inclination angles.

14. The display panel according to claim 13, wherein the fan-out region comprises a first fan-out sub-region, a second fan-out sub-region, and a third fan-out sub-region that are sequentially arranged along the second direction, the first fan-out sub-region and the third fan-out sub-region being located on two sides of the second fan-out sub-region,
the plurality of fan-out leads comprises a plurality of second fan-out leads in the second fan-out sub-region, and a plurality of first fan-out leads in each of the first fan-out sub-region and the third fan-out sub-region,
in each of the first fan-out sub-region and the third fan-out sub-region, the plurality of first fan-out leads is sequentially arranged along the second direction, and each of the plurality of first fan-out leads comprises at least one inflection point, a vertical segment extending along the first pad, and an oblique segment extending along a direction away from the second fan-out sub-region, an intersection point between the vertical segment and the oblique segment being one of the at least one inflection point, in the first fan-out sub-region, an included angle between the second direction and a connection line connecting at least three inflection points that are sequentially arranged is an acute angle α1; and in the third fan-out sub-region, an included angle between the second direction and a connection line connecting at least three inflection points that are sequentially arranged is an acute angle α2, where $\theta1=\alpha1\pm5°$, $\theta2=\alpha2\pm5°$, $2°\leq\theta1\leq80°$, and $2°\leq\theta2\leq80°$.

15. The display panel according to claim 14, wherein in the first direction, the first pad array comprises vertexes or edges of the first pads closest to the display region, a connection line connecting at least some of the vertexes or edges of the first pads is a first connection line, and the first connection line extends along the second direction, wherein at least some of inflection points of the plurality of first fan-out leads are located at a side of the first connection line facing away from the display region.

16. The display panel according to claim 15, further comprising detection circuit provided in a gap between the first pad array and the second pad array along a direction perpendicular to a plane of the display panel, wherein the detection circuit comprise at least one detection circuit device, each of the at least one detection circuit device comprises a plurality of switch transistors for electrical connections, each of the plurality of switch transistors comprises a gate electrode connected to a switch control signal line, a source electrode electrically connected to a reference voltage line, and a drain electrode electrically connected to a first pad of the plurality of first pads, the plurality of first pads is electrically connected to the plurality of fan-out leads in one-to-one correspondence, and same signal lines of the at least one detection circuit device are electrically connected to each other.

17. The display panel according to claim 16, wherein at least one section of the detection circuit in one of the at least one detection circuit device is arranged along a third direction, and an included angle between the third direction and the second direction is an acute angle.

18. The display panel according to claim 16, wherein along the first direction, at least two rows of the first pad array have different numbers of first pads.

19. The display panel according to claim 18, wherein along the first direction, a number of first pads in the at least two rows in the first pad array gradually decreases or increases row by row.

20. The display panel according to claim 16, wherein at least two first pads in each of at least one row in the first pad array have different lengths, wherein along the second direction, for first pads of each of the at least one inclined section in a same row in the first pad group and/or the third pad group, one first pad has a greater length than another first pad farther from the second pad group than the one first pad, and first pads in the first pad group and the third pad group have equal areas.

21. The display panel according to claim 16, wherein a projection of the first pad array has a greater length in the second direction than a projection of the second pad array in the second direction, wherein the second pad array has a third end and a fourth end that are opposite to each other in the second direction, and a vertical distance between any point on the third end and the first pad group is greater than 0, and a vertical distance between any point on the fourth end and the third pad group is greater than 0.

22. The display panel according to claim 21, wherein along the second direction, the second pad array comprises a fourth pad group, a fifth pad group, and a sixth pad group, the fourth pad group and the sixth pad group are located on two sides of the fifth pad group, respectively, for second pads in a same row in the fourth pad group and/or in the sixth pad group, one second pad has a greater length than another second pad that is farther from the fifth pad group than the one second pad, and second pads in the fourth pad group and the sixth pad group have equal areas.

23. A display apparatus, comprising a display panel having a display region and a non-display region surrounding the display region, the non-display region comprising a bonding region and a fan-out region, wherein the display panel comprises:

a plurality of signal lines extending along a first direction and arranged along a second direction in the display region, the first direction intersecting with the second direction;

a driving chip bonded in the bonding region;

a plurality of bonding pads provided in the bonding region; and a plurality of fan-out leads provided in the fan-out region, wherein the plurality of bonding pads comprises a first pad array and a second pad array, the first pad array being located at a side of the second pad array close to the display region, wherein the first pad array comprises a plurality of first pads arranged in at least two rows, and the plurality of signal lines is electrically connected to the plurality of first pads via the plurality of fan-out leads, wherein the second pad array comprise a plurality of second pads arranged in at least one row, and the plurality of second pads is electrically connected to corresponding signal pins on a flexible circuit board, wherein the first pad array comprises a first pad group, wherein first pads in a same row in the first pad group comprises at least one inclined section each composed of at least three first pads that are sequentially arranged, and wherein in one of the at least one inclined section, an included angle between the second direction and a connection line connecting a vertex of a first one of the at least three first pads with a vertex of a last one of the at least three first pads is defined as an inclination angle of the one inclined section, and the inclination angle is an acute angle θ1;

wherein the fan-out region comprises a first fan-out sub-region, the plurality of fan-out leads comprises a plurality of first fan-out leads arranged in the first fan-out sub-region, each of the plurality of first fan-out leads is electrically connected to a corresponding first pad in the first pad group, the plurality of first fan-out leads is sequentially arranged along the second direction, each of the plurality of first fan-out leads comprises at least one inflection point, a vertical segment extending along the first direction, and an oblique segment intersecting the first direction, wherein an intersection point between the vertical segment and the oblique segment is one of the at least one inflection point, and the vertical segment of each of the plurality of first fan-out leads is electrically connected to the corresponding first pad, wherein an included angle between the second direction and a connection line connecting inflection points of at least three first fan-out leads that are sequentially arranged in the first fan-out sub-region is an acute angle $\alpha 1$, where $\theta 1 = \alpha 1 \pm 5°$, and $2° \leq \theta 1 \leq 80°$; and wherein a projection of the at least one inflection point of at least one first fan-out lead of the plurality of first fan-out leads on the display panel is within a projection of the driving chip on the display panel.

* * * * *